United States Patent
Liu et al.

(10) Patent No.: US 11,907,838 B2
(45) Date of Patent: Feb. 20, 2024

(54) RECOGNITION METHOD, APPARATUS, AND DEVICE, AND STORAGE MEDIUM

(71) Applicant: ALIBABA GROUP HOLDING LIMITED, Grand Cayman (KY)

(72) Inventors: Shuangrui Liu, Beijing (CN); Zhe Tang, Beijing (CN); Wenchao Guo, Beijing (CN); Jianqiang Ma, Beijing (CN); Minfeng Xu, Beijing (CN)

(73) Assignee: ALIBABA GROUP HOLDING LIMITED, George Town (KY)

(*) Notice: Subject to any disclaimer, the term of this patent is extended or adjusted under 35 U.S.C. 154(b) by 342 days.

(21) Appl. No.: 17/325,777

(22) Filed: May 20, 2021

(65) Prior Publication Data

US 2021/0366151 A1 Nov. 25, 2021

(30) Foreign Application Priority Data

May 22, 2020 (CN) .......................... 202010442689.9

(51) Int. Cl.
*G06N 3/08* (2023.01)
*G06T 7/73* (2017.01)
(Continued)

(52) U.S. Cl.
CPC ........... *G06N 3/08* (2013.01); *G06F 18/2113* (2023.01); *G06T 5/30* (2013.01); *G06T 7/11* (2017.01);
(Continued)

(58) Field of Classification Search
CPC ...... G06N 3/08; G06N 3/045; G06F 18/2113; G06T 5/30; G06T 7/11; G06T 7/60;
(Continued)

(56) References Cited

U.S. PATENT DOCUMENTS

| 7,035,461 B2 | 4/2006 | Luo et al. |
| 7,577,297 B2 | 8/2009 | Mori et al. |

(Continued)

FOREIGN PATENT DOCUMENTS

| CN | 102819841 A | 12/2012 |
| CN | 108520247 A | 9/2018 |

(Continued)

OTHER PUBLICATIONS

Zahra et al. Simultaneous Object Detection and Localization using Convolutional Neural Networks (Year: 2018).*

(Continued)

*Primary Examiner* — John B Strege

(57) ABSTRACT

An image recognition method includes: obtaining an image; extracting a target image region corresponding to a target part from the image, wherein the target image region includes a target object; determining a location of the target object in the target image region (i) according to pixel values of pixels in the target image region and a location relationship between the pixels, or (ii) inputting the target image region to a trained segmentation model to obtain the location of the target object in the target image region; and displaying a recognition result of the image, wherein the recognition result indicates the location of the target object in the target image region.

18 Claims, 9 Drawing Sheets

(51) Int. Cl.
*G06T 7/11* (2017.01)
*G06T 7/60* (2017.01)
*G06T 5/30* (2006.01)
*G06F 18/2113* (2023.01)
*G06V 10/764* (2022.01)
*G06V 10/778* (2022.01)
*G06V 10/44* (2022.01)

(52) U.S. Cl.
CPC ............... *G06T 7/60* (2013.01); *G06T 7/74* (2017.01); *G06V 10/454* (2022.01); *G06V 10/764* (2022.01); *G06V 10/7784* (2022.01); *G06T 2207/20081* (2013.01); *G06T 2207/20084* (2013.01); *G06V 2201/07* (2022.01)

(58) Field of Classification Search
CPC ............. G06T 7/74; G06T 2207/20081; G06T 2207/20084; G06T 2207/20036; G06T 2207/30061; G06T 2207/30096; G06V 10/454; G06V 10/764; G06V 10/7784; G06V 2201/07; G06V 2201/03
See application file for complete search history.

(56) References Cited

U.S. PATENT DOCUMENTS

| | | | |
|---|---|---|---|
| 8,111,923 B2 | 2/2012 | Csurka et al. | |
| 8,175,376 B2 | 5/2012 | Marchesotti et al. | |
| 8,391,590 B2 | 3/2013 | Yalla et al. | |
| 8,411,932 B2 | 4/2013 | Liu et al. | |
| 8,452,108 B2 | 5/2013 | Walch | |
| 8,515,136 B2 | 8/2013 | Mori et al. | |
| 8,570,383 B2 | 10/2013 | Klefenz et al. | |
| 8,638,993 B2 | 1/2014 | Lee et al. | |
| 8,750,619 B2 | 6/2014 | Chaki et al. | |
| 8,781,221 B2 | 7/2014 | Ding et al. | |
| 8,861,881 B2 | 10/2014 | Tate et al. | |
| 8,873,812 B2 | 10/2014 | Larlus-Iarrondo et al. | |
| 8,913,847 B2 | 12/2014 | Tang et al. | |
| 9,042,650 B2 | 5/2015 | Robinson | |
| 9,064,147 B2 | 6/2015 | Ouyang et al. | |
| 9,336,610 B2 | 5/2016 | Ohashi et al. | |
| 9,619,735 B1 | 4/2017 | Lineback et al. | |
| 9,626,594 B2 | 4/2017 | Soldevila et al. | |
| 9,740,925 B2 | 8/2017 | Haji et al. | |
| 9,805,281 B2 | 10/2017 | Wu et al. | |
| 10,127,437 B2 | 11/2018 | Bhanu et al. | |
| 10,839,573 B2 | 11/2020 | Marino et al. | |
| 2007/0100226 A1 | 5/2007 | Yankelevitz et al. | |
| 2011/0249895 A1 | 10/2011 | Lin | |
| 2012/0170852 A1 | 7/2012 | Zhang et al. | |
| 2013/0121592 A1 | 5/2013 | Fujiki et al. | |
| 2015/0170002 A1 | 6/2015 | Szegedy et al. | |
| 2016/0328630 A1 | 11/2016 | Han et al. | |
| 2017/0034409 A1* | 2/2017 | Chen | H04N 23/64 |
| 2017/0160392 A1* | 6/2017 | Brisimitzakis | G01S 7/062 |
| 2017/0277981 A1 | 9/2017 | Zhou et al. | |
| 2019/0333197 A1* | 10/2019 | Kask | G06T 5/20 |
| 2019/0364196 A1* | 11/2019 | Song | G11B 27/031 |
| 2020/0058126 A1 | 2/2020 | Wang et al. | |
| 2020/0211188 A1* | 7/2020 | Gao | G06N 3/08 |
| 2020/0311453 A1 | 10/2020 | Li et al. | |
| 2020/0334795 A1* | 10/2020 | Wu | G06T 7/74 |
| 2020/0394452 A1 | 12/2020 | Ma et al. | |
| 2021/0350572 A1* | 11/2021 | Wang | G06T 7/20 |
| 2021/0366151 A1* | 11/2021 | Liu | G06T 7/60 |
| 2021/0382496 A1* | 12/2021 | Yasuda | G01B 11/00 |
| 2022/0277481 A1* | 9/2022 | Bai | G06T 7/75 |

FOREIGN PATENT DOCUMENTS

| | | |
|---|---|---|
| CN | 110544258 A | 12/2019 |
| CN | 110675409 A | 1/2020 |
| CN | 111091132 A | 5/2020 |
| CN | 111161275 A | 5/2020 |

OTHER PUBLICATIONS

First Search for Chinese Application No. 202010442689.9 dated Dec. 27, 2021.

First Office Action for Chinese Application No. 202010442689.9 dated Jan. 5, 2022.

Wang, "A Research of Multi-Modal MRI-Based Brain Tumor Segmentation Methods," Shandong University, Thesis for Master Degree, May 20, 2018, with English translation of abstract.

Sun, "Research and Application of Rice Chalkiness Recognition Algorithm Based on Deep Learning," Dec. 15, 2019, with English machine translation of abstract.

Ye et al., "Autonomous Navigation System for Orchard Working Robot Based on Image Boundary Extraction," China Academic Journal Electronic Publishing House, Aug. 31, 2017, with English translation of abstract.

Zhang et al., "Research on Multi-Target Organs' Segmentation of Abdominal CT Image Based on Super-Pixel Method," China Academic Journal Electornic Publishing House, Jan. 10, 2018, with English translation of abstract.

Liu, "Study on Segmentation and Reconstruction Based on Medical CT Images," Apr. 15, 2019, with English translation of abstract.

Supplemental Search for Chinese Application No. 202010442689.9 dated Feb. 24, 2022.

Written Opinion and International Search Report for PCT Application No. PCT/US2021/033424 dated Sep. 7, 2021.

\* cited by examiner

Image for recognition

RECOGNITION METHOD, APPARATUS, AND DEVICE, AND STORAGE MEDIUM

CROSS REFERENCE TO RELATED APPLICATIONS

This application claims priority to and benefits of Chinese Patent Application No. 202010442689.9 filed on May 22, 2020, the content of which is incorporated herein by reference in its entirety.

TECHNICAL FIELD

This application relates to the field of computer technologies, and in particular, to a recognition method, apparatus, and device, and a storage medium.

BACKGROUND

With the development of computer vision, a computer can use an image processing technology to recognize whether a target object exists in an image. This method has been widely applied to a plurality of fields. For example, in the field of intelligent transportation, current vehicle density on a road may be determined by recognizing vehicles on the road in a current period of time, to understand a real-time road condition. In another example, in the medical field, whether a lesion exists in a medical image needs to be recognized.

Therefore, as shown in the foregoing scenarios, how to ensure accuracy of recognition becomes a problem to be resolved urgently.

SUMMARY

In view of this, embodiments of this application provide a recognition method, apparatus, and device, and a storage medium, to ensure accuracy of target object recognition.

According to a first aspect, the embodiments of this application provide a recognition method. The method includes: obtaining an image in response to an input operation triggered by a user; extracting a target image region corresponding to a target part from the image, where the target image region includes a target object; estimating a location of the target object in the target image region according to pixel values of pixels in the target image region and a location relationship between the pixels under a first condition; inputting the target image region to a segmentation model under a second condition, for the segmentation model to output the location of the target object in the target image region; and displaying a recognition result including the location of the target object in the target image region.

According to a second aspect, the embodiments of this application provide a recognition apparatus. The apparatus includes: an obtaining module, configured to obtain an image in response to an input operation triggered by a user; an extraction module, configured to extract a target image region corresponding to a target part from the image, where the target image region includes a target object; an estimation module, configured to estimate a location of the target object in the target image region according to pixel values of pixels in the target image region and a location relationship between the pixels under a first condition; an input module, configured to input the target image region to a segmentation model under a second condition, for the segmentation model to output the location of the target object in the target image region; and a display module, configured to display a recognition result including the location of the target object in the target image region.

According to a third aspect, the embodiments of this application provide an electronic device. The electronic device includes: a processor and a memory, where the memory is configured to store one or more computer instructions, where when the one or more computer instructions are executed by the processor, the recognition method according to the first aspect is implemented. The electronic device may further include a communication interface, configured to communicate with other devices or communication networks.

According to a fourth aspect, the embodiments of this application provide a non-transitory machine-readable storage medium, and the non-transitory machine-readable storage medium stores executable code. The executable code, when executed by a processor of an electronic device, causes the processor to at least implement the recognition method in the first aspect.

According to a fifth aspect, the embodiments of this application provide a recognition method. The method includes: obtaining an image, where the image includes a target image region, and the target image region includes a target object; calculating a location of the target object in the target image region according to pixel values of at least a part of pixels in the target image region and a location relationship between the pixels under a first condition; and inputting the target image region to a segmentation model under a second condition, for the segmentation model to output the location of the target object in the target image region.

According to a sixth aspect, the embodiments of this application provide a recognition apparatus. The apparatus includes: an obtaining module, configured to obtain an image, where the image includes a target image region, and the target image region includes a target object; a calculation module, configured to calculate a location of the target object in the target image region according to pixel values of at least a part of pixels in the target image region and a location relationship between the pixels under a first condition; and an input module, configured to input the target image region to a segmentation model under a second condition, for the segmentation model to output the location of the target object in the target image region.

According to a seventh aspect, the embodiments of this application provide an electronic device. The electronic device includes: a processor and a memory, where the memory is configured to store one or more computer instructions, where when the one or more computer instructions are executed by the processor, the recognition method according to the fifth aspect is implemented. The electronic device may further include a communication interface, configured to communicate with other devices or communication networks.

According to an eighth aspect, the embodiments of this application provide a non-transitory machine-readable storage medium, and the non-transitory machine-readable storage medium stores executable code. The executable code, when executed by a processor of an electronic device, causes the processor to at least implement the recognition method in the fifth aspect.

According to a ninth aspect, the embodiments of this application provide a recognition method. The method includes: obtaining an image in response to an input operation triggered by a user; extracting a target image region corresponding to a target part from the image, where the target image region includes a target object; estimating a first location of the target object in the target image region according to pixel values of pixels in the target image region and a location relationship between the pixels; inputting the target image region to a segmentation model, for the segmentation model to output a second location of the target object in the target image region; and separately displaying a recognition result including the first location and a recognition result including the second location.

According to a tenth aspect, the embodiments of this application provide a recognition apparatus. The apparatus includes: an obtaining module, configured to obtain an image in response to an input operation triggered by a user; an extraction module, configured to extract a target image region corresponding to a target part from the image, where the target image region includes a target object; an estimation module, configured to estimate a first location of the target object in the target image region according to pixel values of pixels in the target image region and a location relationship between the pixels; an input module, configured to input the target image region to a segmentation model, for the segmentation model to output a second location of the target object in the target image region; and a display module, configured to separately display a recognition result including the first location and a recognition result including the second location.

According to an eleventh aspect, the embodiments of this application provide an electronic device. The electronic device includes: a processor and a memory, where the memory is configured to store one or more computer instructions, where when the one or more computer instructions are executed by the processor, the recognition method according to the ninth aspect is implemented. The electronic device may further include a communication interface, configured to communicate with other devices or communication networks.

According to a twelfth aspect, the embodiments of this application provide a non-transitory machine-readable storage medium, and the non-transitory machine-readable storage medium stores executable code. The executable code, when executed by a processor of an electronic device, causes the processor to at least implement the recognition method in the ninth aspect.

According to a thirteenth aspect, the embodiments of this application provide a recognition method. The method includes: obtaining an image in response to an input operation triggered by a user; extracting a target image region corresponding to a target part from the image, where the target image region includes a target object; estimating a first location of the target object in the target image region according to pixel values of pixels in the target image region and a location relationship between the pixels; transmitting the first location and the target image region to a segmentation model, for the segmentation model to output a second location of the target object in the target image region; determining a corrected location according to the first location and the second location; and displaying a recognition result including the corrected location.

According to a fourteenth aspect, the embodiments of this application provide a recognition apparatus. The apparatus includes: an obtaining module, configured to obtain an image in response to an input operation triggered by a user; an extraction module, configured to extract a target image region corresponding to a target part from the image, where the target image region includes a target object; an estimation module, configured to estimate a first location of the target object in the target image region according to pixel values of pixels in the target image region and a location relationship between the pixels; a transmission module, configured to transmit the target image region to a segmentation model, for the segmentation model to output a second location of the target object in the target image region; a correction module, configured to determine a corrected location according to the first location and the second location; and a display module, configured to display a recognition result including the corrected location.

According to a fifteenth aspect, the embodiments of this application provide an electronic device. The electronic device includes: a processor and a memory, where the memory is configured to store one or more computer instructions, where when the one or more computer instructions are executed by the processor, the recognition method according to the thirteenth aspect is implemented. The electronic device may further include a communication interface, configured to communicate with other devices or communication networks.

According to a sixteenth aspect, the embodiments of this application provide a non-transitory machine-readable storage medium, and the non-transitory machine-readable storage medium stores executable code. The executable code, when executed by a processor of an electronic device, causes the processor to at least implement the recognition method in the thirteenth aspect.

According to a seventeenth aspect, the embodiments of this application provide a recognition method. The method includes: obtaining an image in response to an input operation triggered by a user; extracting a target image region corresponding to a target part from the image, where the target image region includes a target object; transmitting the target image region to a first segmentation model, for the segmentation model to output a first location of the target object in the target image region; transmitting the target image region to a second segmentation model, for the segmentation model to output a second location of the target object in the target image region, where recognition precision of the first segmentation model is different from recognition precision of the second segmentation model; and separately displaying a recognition result including the first location and a recognition result including the second location.

According to an eighteenth aspect, the embodiments of this application provide a recognition apparatus. The apparatus includes: an obtaining module, configured to obtain an image in response to an input operation triggered by a user; an extraction module, configured to extract a target image region corresponding to a target part from the image, where the target image region includes a target object; an input module, configured to input the target image region to a first segmentation model, for the segmentation model to output a first location of the target object in the target image region; a transmission module, configured to transmit the target image region to a second segmentation model, for the segmentation model to output a second location of the target object in the target image region, where recognition precision of the first segmentation model is different from recognition precision of the second segmentation model; and a display module, configured to separately display a recognition result including the first location and a recognition result including the second location.

According to a nineteenth aspect, the embodiments of this application provide an electronic device. The electronic device includes: a processor and a memory, where the memory is configured to store one or more computer instructions, where when the one or more computer instructions are executed by the processor, the recognition method according to the seventeenth aspect is implemented. The electronic device may further include a communication interface, configured to communicate with other devices or communication networks.

According to a twentieth aspect, the embodiments of this application provide a non-transitory machine-readable storage medium, and the non-transitory machine-readable storage medium stores executable code. The executable code, when executed by a processor of an electronic device, causes the processor to at least implement the recognition method in the seventeenth aspect.

According to another aspect, the embodiments of this application provide an image recognition method. The image recognition method includes: obtaining an image; extracting a target image region corresponding to a target part from the image, wherein the target image region includes a target object; determining a location of the target object in the target image region according to pixel values of pixels in the target image region and a location relationship between the pixels, or inputting the target image region to a trained segmentation model to obtain the location of the target object in the target image region; and displaying a recognition result of the image, wherein the recognition result indicates the location of the target object in the target image region.

In some embodiments, the method further includes: determining a size of the target object; and determining a proportion of the target object in the target image region according to the size of the target object. The recognition result includes the proportion.

In some embodiments, the location of the target object in the target image region is determined according to the pixel values of pixels in the target image region and the location relationship between the pixels under a first condition. The first condition indicates that a quantity of historical images obtained within a preset period of time is less than a preset quantity, and the historical images are labeled with locations of the target object in the historical images.

In some embodiments, the location of the target object in the target image region is obtained by inputting the target image region to the trained segmentation model under a second condition. The second condition indicated that the quantity of the historical images obtained within the preset period of time is greater than or equal to the preset quantity. And the method further includes: extracting historical image regions corresponding to the target part from the historical images, wherein the historical image regions comprise the target object; and training a segmentation model using the locations of the target object in the historical image regions to obtain the trained segmentation model.

In some embodiments, the determining a location of the target object in the target image region according to pixel values of pixels in the target image region and a location relationship between the pixels includes: determining a plurality of target pixels in the target image region that have pixel values meeting a preset range; correcting the plurality of target pixels according to a location relationship between the plurality of target pixels to generate corrected target pixels; and determining the location of the target object in the target image region according to locations of the corrected target pixels.

In some embodiments, the inputting the target image region to a trained segmentation model to obtain the location of the target object in the target image region includes: performing dilation processing on the target image region to generate a dilated target image region; determining an image region in the dilated target image region that has a preset size, wherein the preset size is greater than a size of the target image region; and providing the image region to the trained segmentation model to obtain the location of the target object in the target image region.

In some embodiments, the image region includes a plurality of target objects, and the method further includes: filtering out one or more target objects according to a size of the target objects and/or a location of the target objects in the image region; and the displaying a recognition result of the image includes: displaying a recognition result indicating locations of remaining target objects in the target image region.

In some embodiments, the filtering out one or more target objects according to a size of the target objects and/or a location of the target objects in the image region includes: filtering out the one or more target objects if the size of the one or more target objects is less than a preset threshold; and/or filtering out the one or more target objects if the one or more target objects are not located in the target image region.

In some embodiments, the trained segmentation model includes a convolutional neural network.

In some embodiments, the step of determining a location of the target object in the target image region according to pixel values of pixels in the target image region and a location relationship between the pixels, obtains a first location of the target object in the target image region. The step of providing the target image region to the trained segmentation model obtains a second location of the target object in the target image region. The first location and the second location are displayed separately.

According to another aspect, the embodiments of this application provide an apparatus. The apparatus includes one or more processors and a memory communicatively connected to the one or more processors. The memory stores instructions executable by the one or more processors to cause the one or more processors to perform operations including: obtaining an image; extracting a target image region corresponding to a target part from the image, wherein the target image region includes a target object; determining a location of the target object in the target image region according to pixel values of pixels in the target image region and a location relationship between the pixels, or inputting the target image region to a trained segmentation model to obtain the location of the target object in the target image region; and displaying a recognition result of the image, wherein the recognition result indicates the location of the target object in the target image region.

According to another aspect, the embodiments of this application provide one or more non-transitory computer-readable storage media storing instructions which, when executed by one or more processors, cause the one or more processors to perform operations including: obtaining an image; extracting a target image region corresponding to a target part from the image, wherein the target image region includes a target object; determining a location of the target object in the target image region according to pixel values of pixels in the target image region and a location relationship between the pixels, or inputting the target image region to a trained segmentation model to obtain the location of the target object in the target image region; and displaying a recognition result of the image, wherein the recognition result indicates the location of the target object in the target image region.

In the recognition method provided in the embodiments of this application, an image is obtained in response to an input operation triggered by a user, and a target image region corresponding to a target part is extracted from the image, where the target image region may include a target object. A location of the target object is estimated according to pixel values of pixels in the target image region and a location relationship between the pixels under a first condition. Under a second condition, the location of the target object in the target image region may be recognized by using a segmentation model. It can be learned that, the foregoing method provides two different target object recognition manners. Combined use of the two recognition manners can meet recognition requirements under different conditions, and can accurately recognize the location of the target object in the image, thereby ensuring efficiency and precision of target object recognition.

BRIEF DESCRIPTION OF THE DRAWINGS

To describe the technical solutions in the embodiments of this application or in existing technologies more clearly, the accompanying drawings required for describing the embodiments or existing technologies are briefly described below. Apparently, the accompanying drawings in the following description show some embodiments of this application, and a person of ordinary skill in the art may still derive other drawings from these accompanying drawings without creative efforts.

DETAILED DESCRIPTION OF EMBODIMENTS

Figure 1:
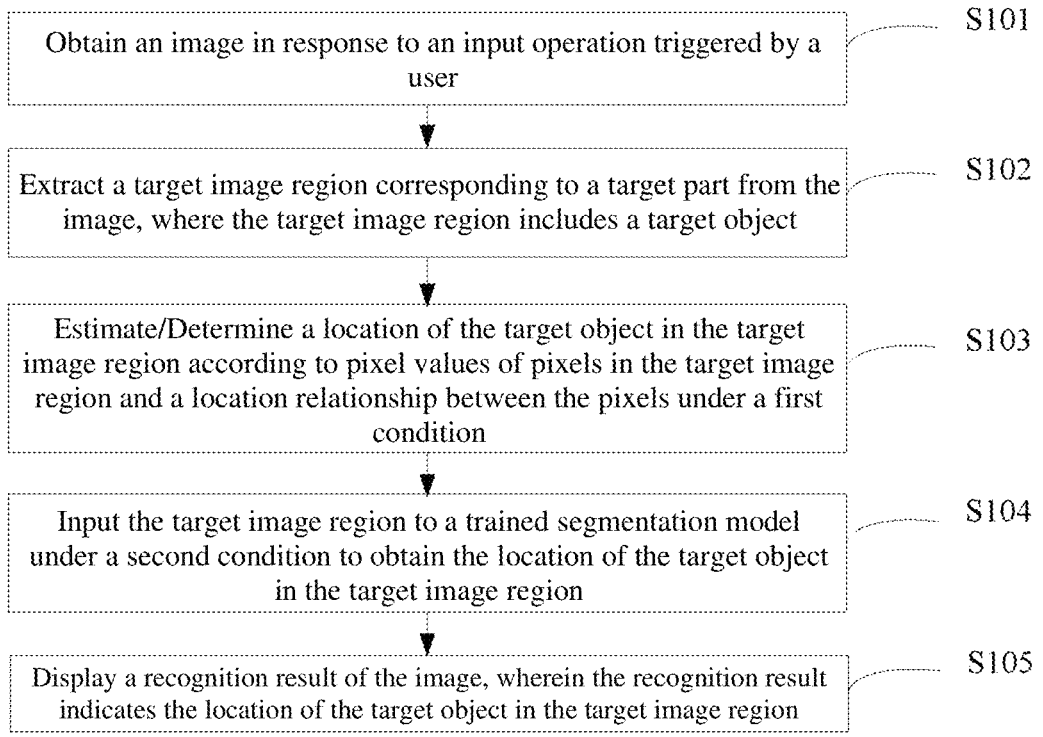
FIG. 1 is a flowchart of a recognition method, according to an embodiment of this application.

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are merely some embodiments of this application rather than all of the embodiments. All other embodiments obtained by a person of ordinary skill in the art based on the embodiments of this application without creative efforts shall fall within the protection scope of this application.

The terms used in the embodiments of this application are merely for the purpose of illustrating specific embodiments, and are not intended to limit this application. The terms "a," "said," and "the" of singular forms used in the embodiments and the appended claims of this application are also intended to include plural forms, unless otherwise specified in the context clearly. The term "a plurality of" generally includes at least two, but not exclude a situation of including at least one.

The term "and/or" used in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Depending on the context, for example, words "if" or "as if" used herein may be explained as "while . . . " or "when . . . " or "in response to determining" or "in response to recognition." Similarly, depending on the context, phrases "if determining" or "if recognizing (a stated condition or event)" may be explained as "when determining" or "in response to determining" or "when recognizing (the stated condition or event)" or "in response to recognition (of the stated condition or event)."

It should be further noted that the terms "include," "contain," and any variants thereof are intended to cover a non-exclusive inclusion. Therefore, a merchandise or a system that includes a series of elements not only includes such elements, but also includes other elements not specified expressly, or but also includes inherent elements of the merchandise or the system. Unless otherwise specified, an element limited by "include a/an . . . " does not exclude other same elements existing in the merchandise or the system that includes the element.

In an intelligent transportation scenario, when a traveling situation of vehicles on a current road needs to be understood in time, there is a requirement for recognizing the vehicles on the road. In this case, a target object mentioned in the following embodiments may be a vehicle, and an image may be an image captured by a camera on a road.

In another instance, because the novel coronavirus pneumonia has raged globally in recent months, to better analyze the novel coronavirus to formulate a related policy for the novel coronavirus pneumonia, another relatively urgent use scenario is for recognizing and analyzing a lesion part in a medical image. In this medical scenario, an image may be a medical image of a part of a human body, and a target object may be a lesion in that part.

In addition to the foregoing scenarios, a recognition method provided in this application is applicable to any scenario where recognizing a target object is required.

Some implementations of this application are described below in detail with reference to accompanying drawings. The following embodiments and features in the embodiments may be combined if no conflict occurs among the embodiments. In addition, a sequence of steps in each of the following method embodiments is merely an example, but not a strict limitation.

FIG. 1 is a flowchart of a recognition method, according to an embodiment of this application, and the recognition method provided in this embodiment of this application may be performed by a recognition device. It may be understood that, the recognition device may be implemented as software, or a combination of software and hardware. Recognition devices in this embodiment and the following embodiments may be a terminal device used by a user. As shown in FIG. 1, the method includes steps S101-S105.

At S101, a recognition device obtains an image in response to an input operation triggered by a user.

At S102, the recognition device extracts a target image region corresponding to a target part from the image, where the target image region may include a target object.

The user may trigger the input operation on an interface provided by the recognition device, for the recognition device to obtain the image inputted by the user. For example, in an intelligent transportation scenario, an image may be an image including a vehicle and a road environment. In another example, in a medical scenario, an image may be a medical image of a part of a human body, such as an X-ray image, a CT image or a magnetic resonance image of a part such as a liver or a lung of the human body.

Figure 2A:
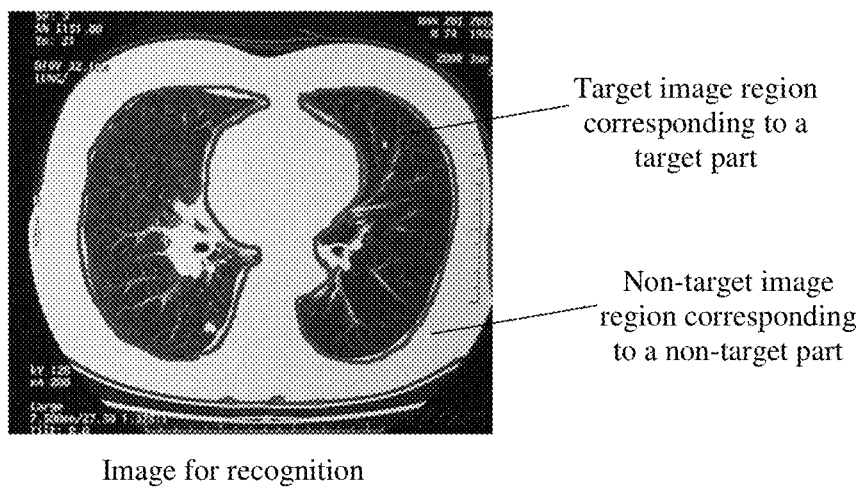
FIG. 2A is a schematic diagram of an image region in an image in a medical scenario, according to an embodiment of this application.

It is easily understood that, the image usually includes both a target part and a non-target part, which can be understood with reference to FIG. 2A. The non-target part usually interferes with recognition of the target object. Therefore, the location of the target part in the image may be further first determined, then the target image region corresponding to the target part is extracted, an image region corresponding to the non-target part is filtered out, and the target object exists only in the target image region.

For extraction of the target image region corresponding to the target object in a pixel-level extraction manner, locations of pixels whose pixel values are located within a preset range in the image may be preliminarily estimated as the location of the target part, and then a morphological operation is performed according to a relationship between the pixels. The preset range of the pixel values may be set according to historical experience.

In another example, the image may be further inputted to a segmentation model trained to converge, for this model to determine the location of the target part in the image. Compared with the pixel-level extraction manner, use of the segmentation model can more accurately obtain the location of the target part.

A relationship between the image, the target part, the target image region and the target object mentioned in the foregoing steps may be understood as follows: The target image region is a part of the image, and the target image region includes the target part; and the target object is a part of the target part, that is, the image region corresponding to the target object is included in the target image region.

In an intelligent transportation scenario, the image may be an image including a vehicle and a road environment, the target part is the vehicle, an image region in which the vehicle is located is the target image region, and the target object may be a license plate number of the vehicle.

Figure 2B:
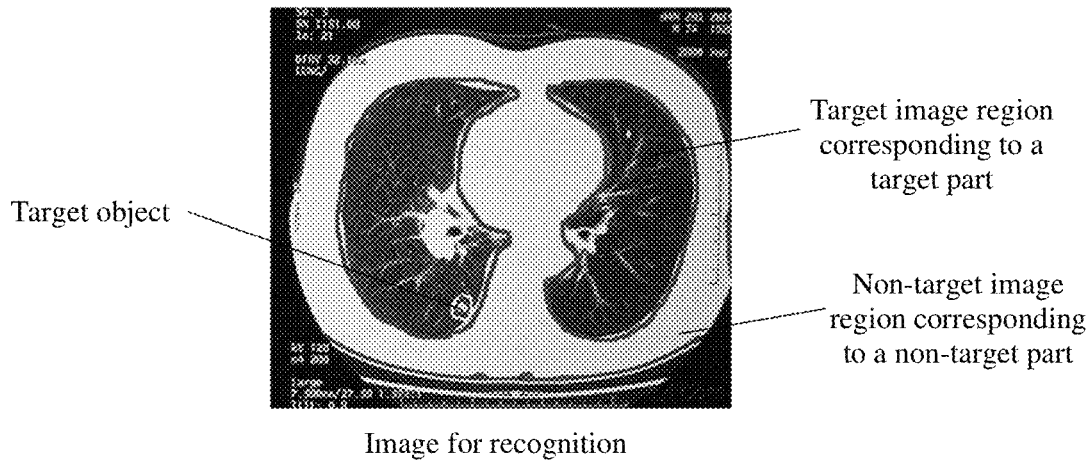
FIG. 2B is a schematic diagram of an image region in an image in a medical scenario, according to an embodiment of this application.

In a medical scenario, the image may be a CT image of a lung, the target part is the lung, the target image region is an image region corresponding to the lung in the CT image, and the target object is a lesion in the lung, which may be understood with reference to FIG. 2B.

At S103, the recognition device estimates/calculates a location of the target object in the target image region according to pixel values of pixels in the target image region and a location relationship between the pixels under a first condition.

At S104, the recognition device inputs the target image region to a segmentation model under a second condition, for the segmentation model to output the location of the target object in the target image region.

Then, a condition which a current case meets is determined. In some embodiments, if a quantity of historical images obtained within a preset period of time is less than a preset quantity, that is, if a plurality of historical images have been obtained before the image is obtained, and the quantity of historical images is less than the preset quantity, it is determined that the first condition is currently met.

The historical images may include images inputted by the user within the preset period of time, and may also include images obtained by the user in another manner within the preset period of time. In this case, the quantity of historical images is insufficient to obtain an accurate segmentation model through training. The locations of the target object in the historical images have been labeled, and a labeling manner may be a manual manner or another manner.

When the first condition is met, the location of the target object in the target image region may be further estimated according to the pixel values of the pixels in the target image region and the location relationship between the pixels.

For location estimation, a plurality of target pixels in the target image region whose pixel values meet a preset range are first determined, where the preset range may be set according to historical experience. Because the target pixels are estimated according to the pixel values of the pixels, it is very easy for an isolated target pixel point or isolated pixel block to occur. The pixels used for describing the target object are usually a plurality of pixels or a plurality of pixel blocks whose pixel coordinates are close. In this case, this isolated target pixel point or pixel block may be considered as a noisy point, and may be directly filtered out. Moreover, a case that a non-target pixel point A is surrounded by the target pixels may further occur. In this case, this non-target pixel point A may be also directly assumed as a target pixel point. Correction of pixels is completed in the foregoing two manners. Finally, the location of the target object is estimated according to locations of corrected target pixels.

In some embodiments, if a quantity of historical images obtained within a preset period of time is greater than or equal to a preset quantity, that is, if the quantity of historical images obtained before the image is obtained is greater than or equal to the preset quantity, it is determined that the second condition is currently met. In this case, a segmentation model may be obtained through training according to a sufficient quantity of historical images. The target object is similarly labeled in the historical images.

When the second condition is met, the target image region corresponding to the image may be inputted to the segmentation model, for the segmentation model to determine the location of the target object.

A manner of training the segmentation model may be roughly described as follows: The historical image is obtained, the historical image region corresponding to the target part is extracted from the historical image, and because the location of the target object in the historical image has been labeled, the historical image region may be inputted to the segmentation model by using the location of the target object in the historical image region as supervision information, to train the segmentation model.

In some embodiments, how to determine the location of the target object by using the segmentation model may also be performed with reference to embodiments shown in FIG. 3 to FIG. 6.

At S105, the recognition device displays the location of the target object in the target image region.

Regardless of obtaining the location of the target object in the target image region in any of the foregoing manners, the location is displayed to the user through the interface provided by the recognition device.

In this embodiment, an image is obtained in response to an input operation triggered by a user, and a target image region corresponding to a target part is extracted from the image, where the target image region may include a target object. A location of the target object is estimated according to pixel values of pixels in the target image region and a location relationship between the pixels under a first condition. Under a second condition, the location of the target object in the target image region may be recognized by using a segmentation model. The foregoing method actually provides two different target object recognition manners. Combined use of the two recognition manners can meet recognition requirements under different conditions, and can accurately recognize the location of the target object in the image, thereby ensuring efficiency and precision of target object recognition.

Additionally, it should be noted that, it has been mentioned in step S103 and step S104 that the location of the target object may be estimated according to the pixel values of the pixels in the image, or the location of the target object may be determined by using the segmentation model, both of which are two completely independent location determining manners. Usually, the segmentation model can more accurately determine the location of the target object in the image.

However, at different stages of actual application, such as an early stage at which a target object recognition requirement is put forward, because there are a relatively small quantity of historical images, which is insufficient to obtain, through training, a segmentation model whose recognition result is accurate, after the image is obtained, the location of the target object is usually estimated according to pixel values of pixels in the image.

As images are continuously accumulated, at intermediate and late stages for extraction and detection requirements, when the quantity of historical images has been sufficient to obtain, through training, an accurate segmentation model, the target object may be precisely recognized by directly using the segmentation model.

It should be further noted that, both the segmentation model used in step S102 and the segmentation model used in step S104 play a role in recognizing a target object, but the recognized objects are different, one segmentation model is used for recognizing the target part in the image, and the other segmentation model is used for recognizing the target object in the target image region.

To clearly and concisely describe the foregoing embodiment and the following embodiments, the segmentation model used in step S102 may be referred to as a first segmentation model, and the model used in step S104 may be referred to as a second segmentation model. Moreover, in actual application, both of the two segmentation models may be neural network models such as convolutional neural network (CNN) models.

The second segmentation model may output whether the target object exists in the image, and the location of the target object. In some special scenarios such as a medical scenario, the size of the target object is also one important indicator of analyzing a medical image.

Figure 3:
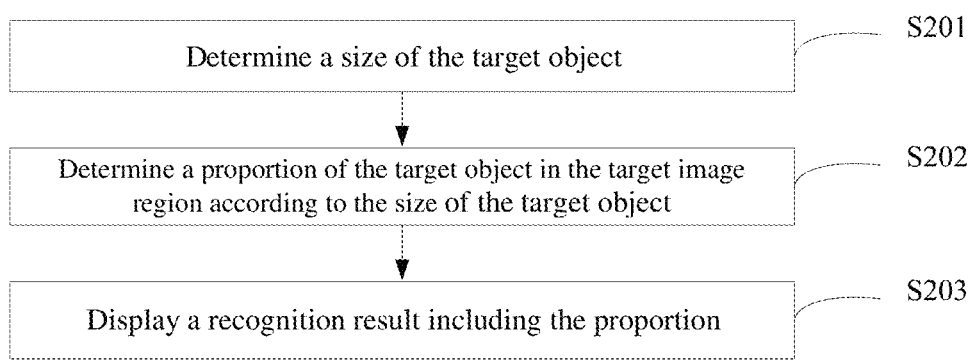
FIG. 3 is a flowchart of another recognition method, according to an embodiment of this application.

Based on the foregoing description, FIG. 3 is a flowchart of another recognition method, according to an embodiment of this application. As shown in FIG. 3, after step S105 of the embodiment shown in FIG. 1, the method may further include the following steps:

S201, determining a size of the target object.

S202, determining a proportion of the target object in the target image region according to the size.

S203, displaying a recognition result including the proportion.

After the second segmentation model determines the location of the target object, the size of the target object may be further determined. Then, a ratio of the size of the target object to a size of the entire target image region, that is, a proportion of the target object in the target image region corresponding to the target part is calculated. This proportion may alternatively be considered as a part of the recognition result, and is displayed to the user.

In this embodiment, based on the location of the target object outputted by the segmentation model, the proportion corresponding to the target object may be further outputted. With the aid of the two parts of content, the target part and the target object may be analyzed more comprehensively, to ensure the analysis effect.

Figure 4:
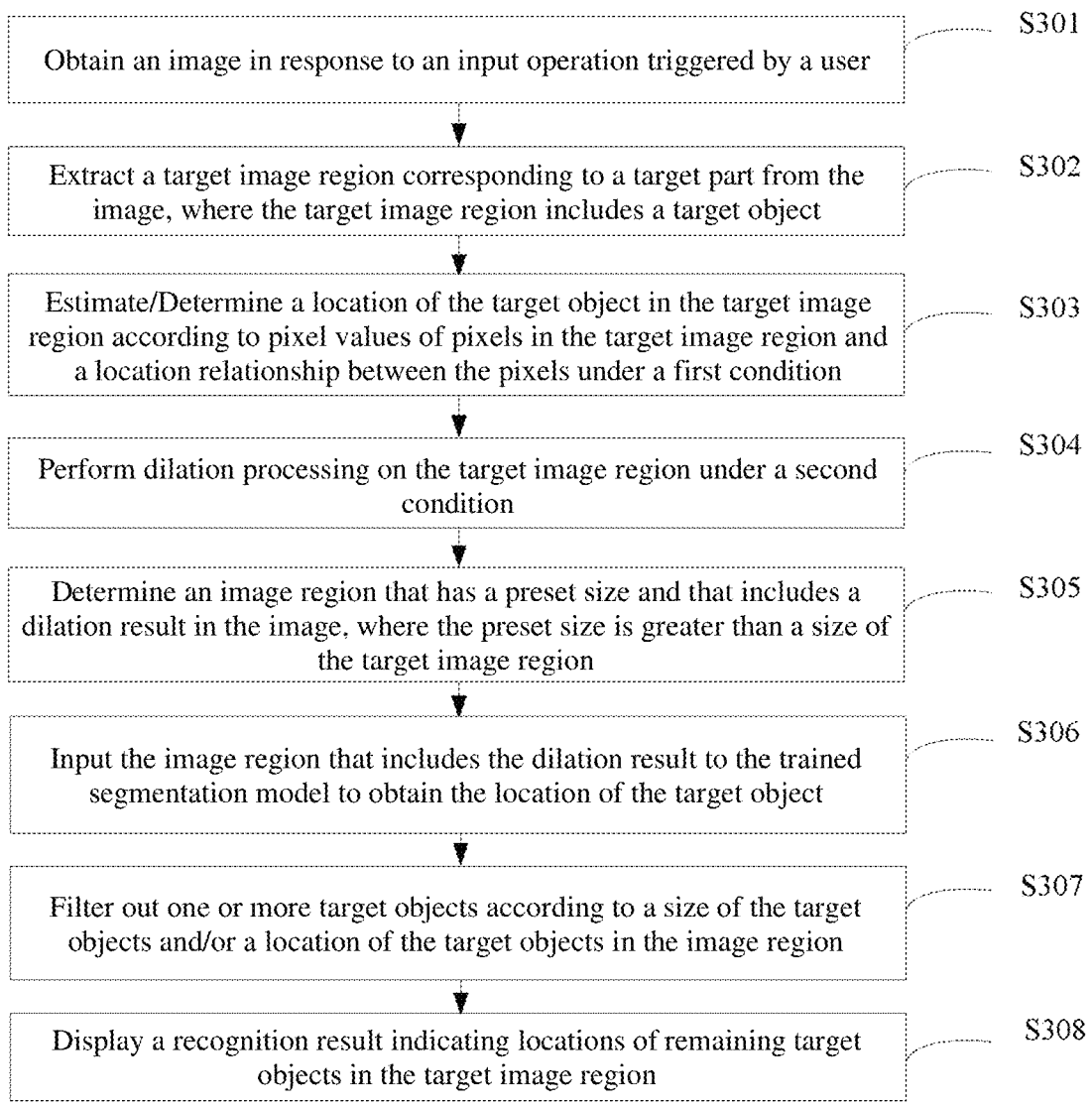
FIG. 4 is a flowchart of still another recognition method, according to an embodiment of this application.

As shown in FIG. 2A and FIG. 2B, a shape of the target image region is the same as that of the target part, and is usually an irregular shape. To make the shape meet an input requirement of the segmentation model (that is, the second segmentation model), FIG. 4 is a flowchart of still another recognition method, according to an embodiment of this application. As shown in FIG. 4, the method may include steps S301-S308.

At S301, a recognition device obtains an image in response to an input operation triggered by a user.

At S302, the recognition device extracts a target image region corresponding to a target part from the image, where the target image region includes a target object.

At S303, the recognition device estimates/calculates a location of the target object in the target image region according to pixel values of pixels in the target image region and a location relationship between the pixels under a first condition.

The execution process of steps S301 to S303 is similar to that of corresponding steps in the foregoing embodiment, reference may be made to the related description in the embodiment shown in FIG. 1, and details are not described herein again.

At S304, the recognition device performs dilation processing on the target image region under the second condition.

At S305, the recognition device determines an image region that has a preset size and that includes a dilation result in the image, where the preset size is greater than a size of the target image region.

At S306, the recognition device inputs the image region that includes the dilation result to the segmentation model, for the segmentation model to output the location of the target object.

Dilation processing is first performed on an irregular target image region, to obtain a dilation result. Missing of detail information in the target image region such as incomplete inside segmentation caused by blood vessels in the lung region may be offset to some extent through dilation processing, and therefore the detail information does not affect the subsequent target object detection process, thereby ensuring detection accuracy.

Then, an image region having a preset size or preset regular shape such as a rectangle or a square is extracted from the image, and the extracted image region needs to completely include the dilation result. Finally, the extracted image region that includes the complete dilation result is inputted to the second segmentation model, for the second segmentation model to output the location of the target object. In some embodiments, the recognition result outputted by the segmentation model may be directly displayed to the user.

Figure 5:
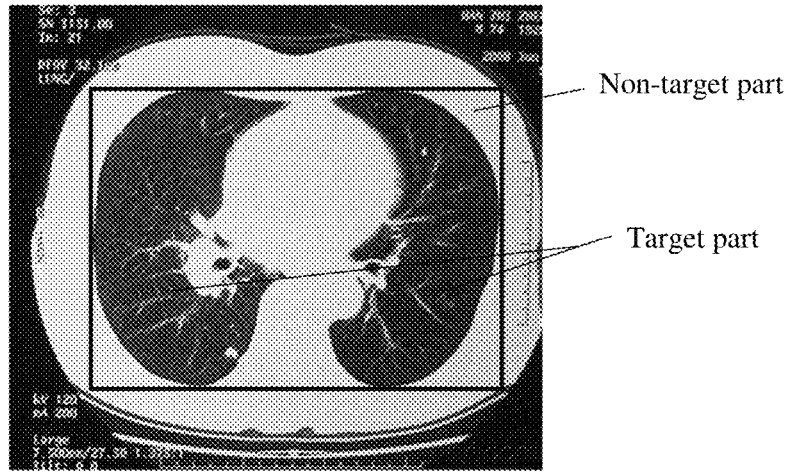
FIG. 5 is a schematic diagram of an image region in an image in a medical scenario, according to an embodiment of this application.

It should be noted that, after step S306, the second segmentation model may determine that the image includes at least one target object. To meet the input requirement of the second segmentation model, as shown in FIG. 5, the image region determined in step S305 includes both the target part and a small quantity of non-target parts. Therefore, the target object determined by the segmentation model may correspond to a non-target part, and further needs to be filtered out, to further ensure the accuracy of target object recognition.

In some embodiments, after step S306, the following steps may be further performed:

At S307, the recognition device filters out the target object according to a size of the target object and/or a location of the target object in the image region that includes the dilation result.

At S308, the recognition device displays a recognition result including locations of remaining target objects in the target image region.

The size of the target object and the location of the target object in the image are determined. If the size of the target object is less than a preset threshold, it indicates that a pixel point or pixel block corresponding to the target object in the image may be a noisy point, and the target object is directly filtered out.

Because the second segmentation model determines the target object in the image region including the complete dilation result, it is very likely to encounter the following case that the target object is completely located beyond the target image region before being subject to dilation processing. For example, the target object may be a lesion of a lung, and the target image region may be the lung. It is easily understood that, only the target object located at the lung is a lesion. Therefore, if the second segmentation model determines that the lesion of the lung is completely located beyond the lung, the target object is directly filtered out.

A case that the target object is incompletely located within the target image region may alternatively occur. In this case, a region in which the target object is located may be compared with the target image region, to determine a part exceeding the target image region in the target object, and the exceeding part is filtered out.

Only one or both of the foregoing manners of filtering out the target object according to the size and the location may be performed. Moreover, finally, a detection result including locations of remaining target objects in the target image region is displayed to the user.

In this embodiment, the target image region corresponding to the target part is correspondingly processed, and therefore the processed target image region can meet the input requirement of the segmentation model, thereby ensuring the accuracy of target object recognition. Moreover, the target object outputted by the segmentation model may be further filtered out from different perspectives, to filter out an evidently erroneous recognition result, thereby further ensuring the accuracy of target object recognition.

Figure 6:
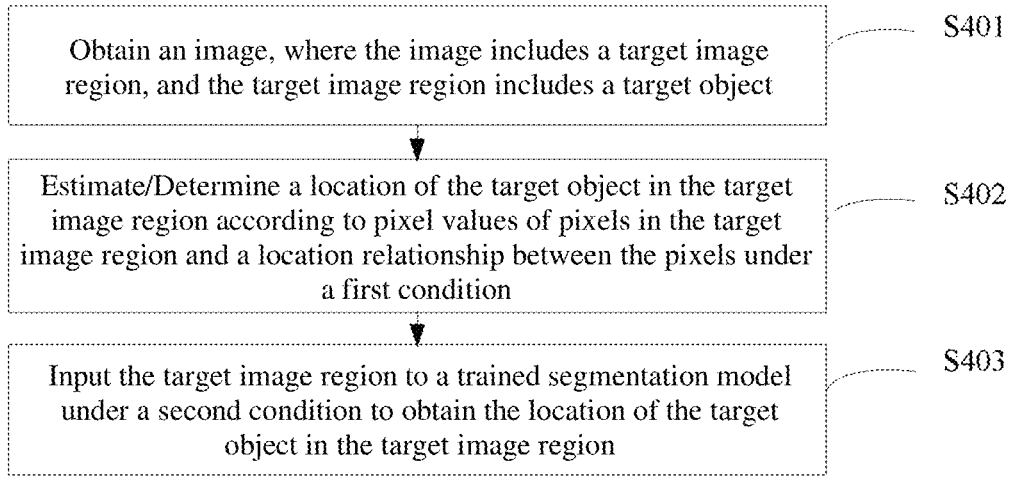
FIG. 6 is a flowchart of still another recognition method, according to an embodiment of this application.

In the embodiments shown in FIG. 1 to FIG. 5, the image may be inputted by the user, and the result outputted by the segmentation model may also be displayed to the user, thereby implementing a human-computer interaction process. Besides, the manner of obtaining the image may alternatively be not limited, and a recognition method is individually provided. FIG. 6 is a flowchart of a recognition method according to still another embodiment of this application. As shown in FIG. 6, the method may include steps A401-S403.

At S401, a recognition device obtains an image, where the image includes a target image region, and the target image region includes a target object.

At S402, the recognition device calculates a location of the target object in the target image region according to pixel values of at least a part of pixels in the target image region and a location relationship between the pixels under a first condition.

At S403, the recognition device inputs the target image region to a segmentation model under a second condition, for the segmentation model to output the location of the target object in the target image region.

The execution process of step S401 to step S403 is similar to that of corresponding steps in the foregoing embodiment, reference may be made to the related descriptions in the foregoing embodiments, and details are not described herein again.

In some embodiments, the segmentation model may be a convolutional neural network.

In some embodiments, the segmentation model may further determine a size of the target object, and further obtain a proportion between the size of the target object and that of a target sample image.

For content not described in detail in this embodiment, reference may be made to the foregoing related content in the embodiments shown in FIG. 1 to FIG. 5, and details are not described herein again.

For a part that is not described in this embodiment in detail, reference may be made to the related descriptions of the embodiments shown in FIG. 1 to FIG. 5. For an execution process and technical effects of the technical solution, reference may also be made to the descriptions of the embodiments shown in FIG. 1 to FIG. 5, and details are not described herein again.

The foregoing recognition methods provided in the embodiments shown in FIG. 1 to FIG. 6 are actually solutions of determining the location of the target object in different manners when different conditions are met. In some embodiments, in actual application, to meet requirements of the user, the location of the target object may be further determined separately in two manners.

Figure 7:
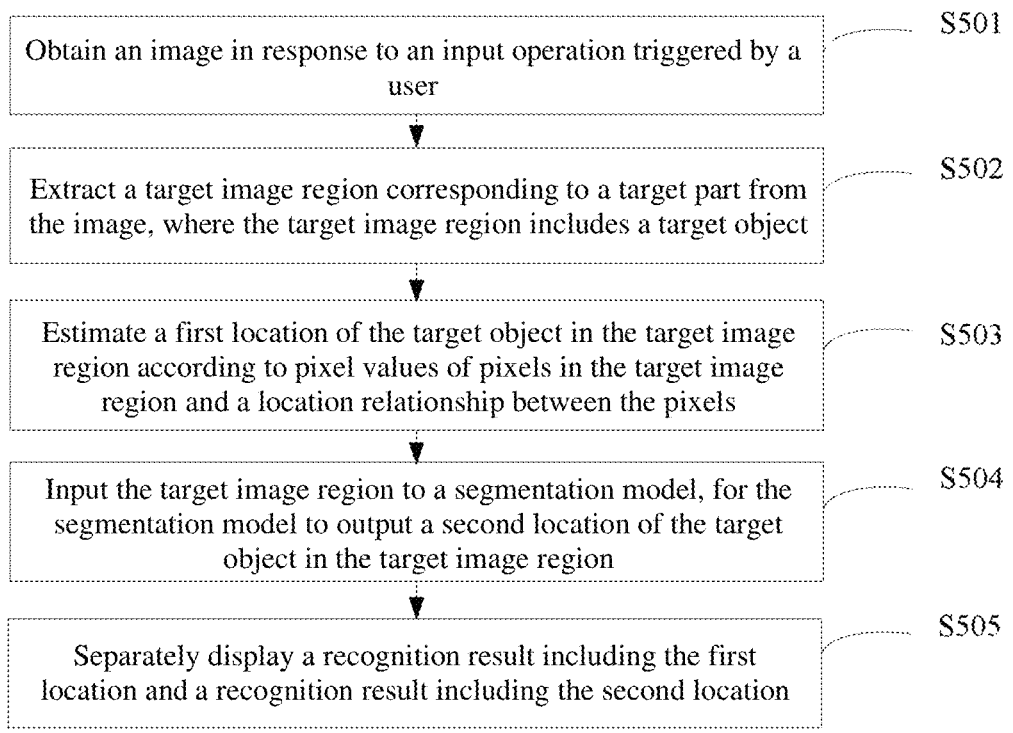
FIG. 7 is a flowchart of still another recognition method, according to an embodiment of this application.

FIG. 7 is a flowchart of a recognition method according to still another embodiment of this application. As shown in FIG. 7, the method may include steps S501-S505.

At S501, a recognition device obtains an image in response to an input operation triggered by a user.

At S502, the recognition device extracts a target image region corresponding to a target part from the image, where the target image region includes a target object.

At S503, the recognition device estimates a first location of the target object in the target image region according to pixel values of pixels in the target image region and a location relationship between the pixels.

At S504, the recognition device inputs the target image region to a segmentation model, for the segmentation model to output a second location of the target object in the target image region.

At S505, the recognition device separately displays a recognition result including the first location and a recognition result including the second location.

For a specific implementation process of steps in this embodiment, reference may be made to the foregoing related descriptions in the embodiments shown in FIG. 1 to FIG. 6, and details are not described herein again. The segmentation model in this embodiment is the second segmentation model in the foregoing embodiments.

In this embodiment, the two recognition results obtained in different manners are both displayed to the user, making it convenient for the user to compare the two recognition results, to understand precision of recognizing the target object in different manners.

It is easily understood that, the foregoing two manners of determining the location of the target object have respective characteristics. Although accuracy of the manner of recognizing the location of the target object according to the pixel values and the locations of the pixels is ordinary, there is no model training process. However, although the location of the target object can be recognized relatively accurately according to the segmentation model, image samples need to be collected and labeled at an early stage, and consequently costs are relatively high.

In actual application, the two manners may be combined in use to ensure the accuracy of target object recognition. Particularly, when image samples are insufficient to make it difficult to obtain an accurate segmentation model through training, this combined use manner can have a better effect.

Figure 8:
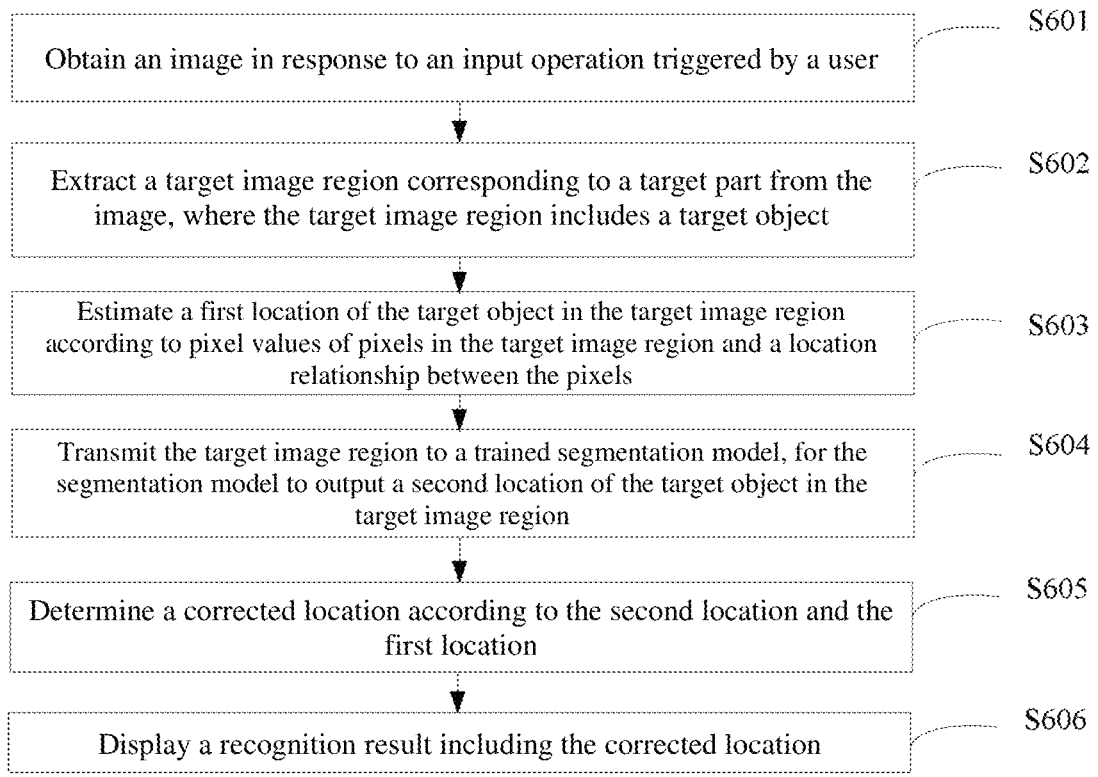
FIG. 8 is a flowchart of still another recognition method, according to an embodiment of this application.

FIG. 8 is a flowchart of a recognition method according to still another embodiment of this application. As shown in FIG. 8, the method may include steps S601-S606.

At S601, a recognition device obtains an image in response to an input operation triggered by a user.

At S602, the recognition device extracts a target image region corresponding to a target part from the image, where the target image region includes a target object.

At S603, the recognition device estimates a first location of the target object in the target image region according to pixel values of pixels in the target image region and a location relationship between the pixels.

The user may trigger the input operation in a recognition device, for the recognition device to obtain the image. This recognition device may be a terminal device used by the user. In this case, the terminal device used by the user performs step S602 to step S603, to obtain the first location of the target object.

At S604, the recognition device transmits the target image region to a segmentation model, for the segmentation model to output a second location of the target object in the target image region.

At S605, the recognition device determines a corrected location according to the second location and the first location.

At S606, the recognition device displays a recognition result including the corrected location.

Then, the terminal device may further transmit the target image region to a segmentation model deployed on a remote server, for the segmentation model to output the second location of the target object. Certainly, the processing capability of the remote server is higher than that of the terminal device used by the user. The remote server may transmit the second location to the terminal device again. Further, the terminal device may perform location correction according to the foregoing two locations. In some embodiments, an intersection set of the two locations may be determined as a corrected location, and this corrected location is displayed to the user.

The segmentation model in this embodiment is the second segmentation model in the foregoing embodiments.

In some embodiments, the terminal device may further calculate a proportion corresponding to the target object, and also display the proportion to the user.

In some embodiments, location correction and proportion calculation may be performed by the remote server, and an execution result is finally transmitted to the terminal device.

In this embodiment, the first location and the second location of the target object may be first separately obtained in two manners, then location correction is performed by using the two locations, and the obtained corrected location can more accurately reflect the location of the target object in the target image region.

Figure 9:
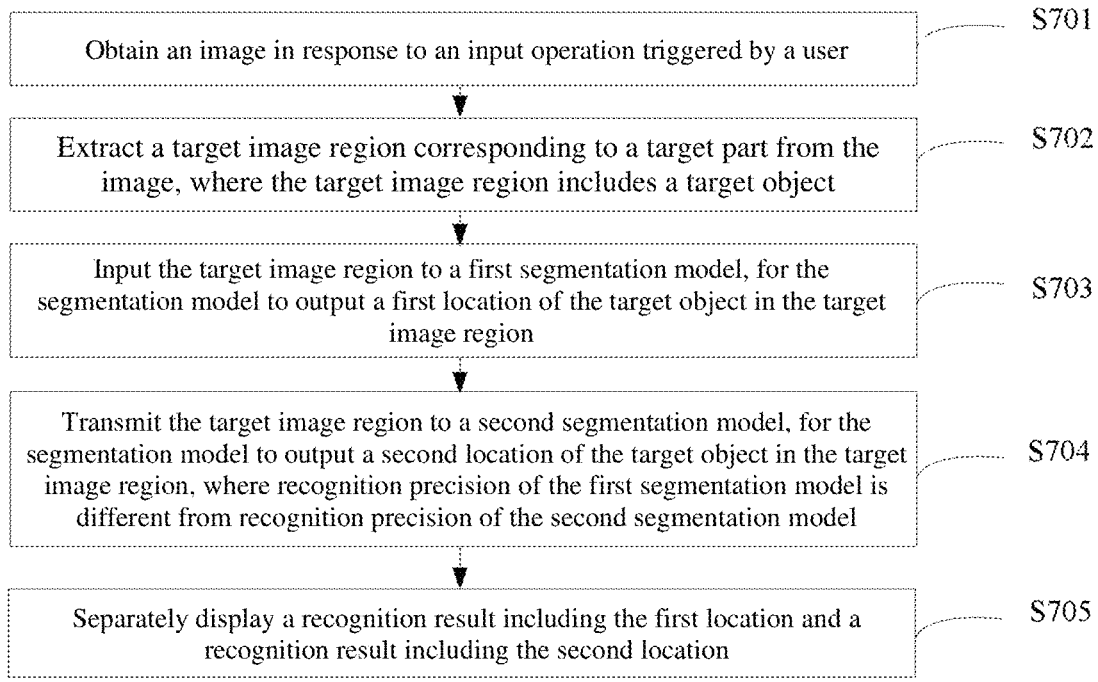
FIG. 9 is a flowchart of still another recognition method, according to an embodiment of this application.

FIG. 9 is a flowchart of a recognition method according to still another embodiment of this application. As shown in FIG. 9, the method may include steps S701-S705.

At S701, a recognition device obtains an image in response to an input operation triggered by a user.

At S702, the recognition device extracts a target image region corresponding to a target part from the image, where the target image region includes a target object.

At S703, the recognition device inputs the target image region to a first segmentation model, for the segmentation model to output a first location of the target object in the target image region.

At S704, the recognition device transmits the target image region to a second segmentation model, for the segmentation model to output a second location of the target object in the target image region, where recognition precision of the first segmentation model is different from recognition precision of the second segmentation model.

At S705, the recognition device separately displays a recognition result including the first location and a recognition result including the second location.

The user may trigger the input operation in a recognition device, for the recognition device to obtain the image. In some embodiments, this recognition device may be a terminal device used by the user.

In some embodiments, segmentation models with different recognition precision may be obtained through pre-training according to different quantities of sample images. For example, the recognition precision of the first segmentation model may be lower than the recognition precision of the second segmentation model. In this case, the first segmentation model may be deployed on the terminal device used by the user, and the second segmentation model may be deployed on the remote server.

The first segmentation model configured in the terminal device used by the user may output the first location of the target object. Then, the terminal device may transmit the target image region to the second segmentation model, for the segmentation model to output the second location of the target object. Finally, the recognition result including the first location and the recognition result including the second location are separately displayed to the user.

It should be noted that, the first segmentation model and the second segmentation model in this embodiment are different from the first segmentation model and the second segmentation model mentioned in the embodiments shown in FIG. 1 to FIG. 8.

The first segmentation model and the second segmentation model in this embodiment may be both considered as the second segmentation model in the embodiments shown in FIG. 1 to FIG. 8, or the first segmentation model and the second segmentation model in this embodiment may be considered as two segmentation models with different recognition precision.

In this embodiment, by displaying the recognition results outputted by the segmentation models with different precision, the user is enabled to determine a recognition precision difference, to use appropriate segmentation models to perform target object recognition in scenarios with different precision requirements.

Figure 10:
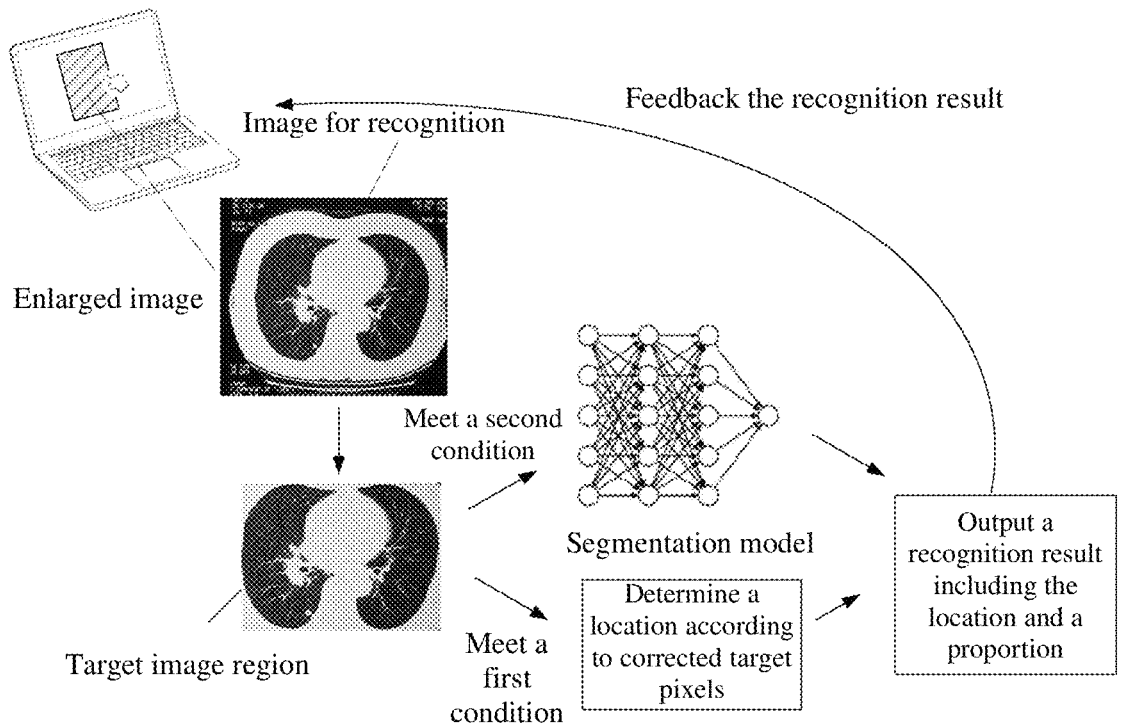
FIG. 10 is a schematic diagram of a recognition method, according to an embodiment of this application in a medical scenario.

For ease of understanding, a specific implementation process of the recognition method provided above is described in an example with reference to the following medical scenario. The following content may be understood with reference to FIG. 10.

A user may input a medical image, that is, an image corresponding to a lung of a human body with the aid of an operation interface provided by a recognition device. The recognition device first extracts a target image region corresponding to a target part, that is, the lung from the medical image. In this case, a shape of the target image region is similar to that of the lung, and is an irregular shape.

If sufficient historical images have been obtained in this case, and the segmentation model has been trained to converge, that is, the second condition is met, the location of the target object, that is, the lesion in the lung may be determined directly by using the segmentation model.

When the segmentation model has a capability of receiving images in irregular shapes, the target image region may be directly inputted to the segmentation model, for the segmentation model to output the location of the target object, that is, the lesion in the lung.

For a segmentation model that cannot receive images in irregular shapes, dilation processing may be further performed on the lung region in the medical image, and then an image region of a preset size is extracted from the medical image after being subject to the dilation processing. This preset size meets the input requirement of the segmentation model. The image region extracted in this case is inputted to the segmentation model, for the segmentation model to output the location of the lesion.

If no segmentation model has been obtained through training in this case, that is, the first condition is met, the location of the target object, that is, the lesion in the lung may be determined directly by using a location relationship between pixels in the target image region and pixel values of the pixels. The location of the lesion is determined according to corrected target pixels.

Moreover, after the location of the lesion is obtained, a proportion of the lesion in the entire lung may be further calculated. Finally, the location of the lesion in the medical image and the proportion corresponding to the lesion may be both displayed to the user, for the user to understand a current situation of the lung.

In addition to the foregoing medical scenario, the foregoing recognition method provided in this application is further applicable to the field of remote sensing. In this scenario, an image is a remote sensing image, the remote sensing image may correspond to a city, a target part in this remote sensing image may be an industrial district in an entire city, and a target object may be a pollution device in the industrial district, such as a metallurgical device or a coal refining device.

Based on the foregoing content, the user may input the remote sensing image with the aid of an operation interface provided by a recognition device, the recognition device may extract a target image region corresponding to the industrial district from the remote sensing image, and this region is usually irregular in shape.

If no segmentation model has been obtained through training, that is, the first condition is met, the location of the target object, that is, the pollution device in the industrial district may be determined directly by using a location relationship between pixels in the target image region and pixel values of the pixels.

If sufficient historical images have been obtained in this case, and the segmentation model has been trained to converge, that is, the second condition is met, the location of the pollution device in the industrial district may be determined directly by using the segmentation model.

However, when no irregularly shaped image can be directly inputted to the segmentation model, dilation and extraction processing may be further performed on the irregularly shaped target image region, to obtain a regularly shaped image including the industrial district, and the regularly shaped image is inputted to the segmentation model, for the segmentation model to output the location of the pollution device in the industrial district.

Moreover, after the location of the pollution device is obtained, a proportion of the pollution device in the entire industrial district may be further calculated. The location and the proportion of the pollution device in the industrial district may be further both displayed to the user, for the user to understand an industrial distribution situation of the current city, and the city may be planned and constructed according to this distribution situation.

Certainly, content not described in this embodiment may be further understood in contrast with the related description in the embodiment shown in FIG. 7.

Figure 11:
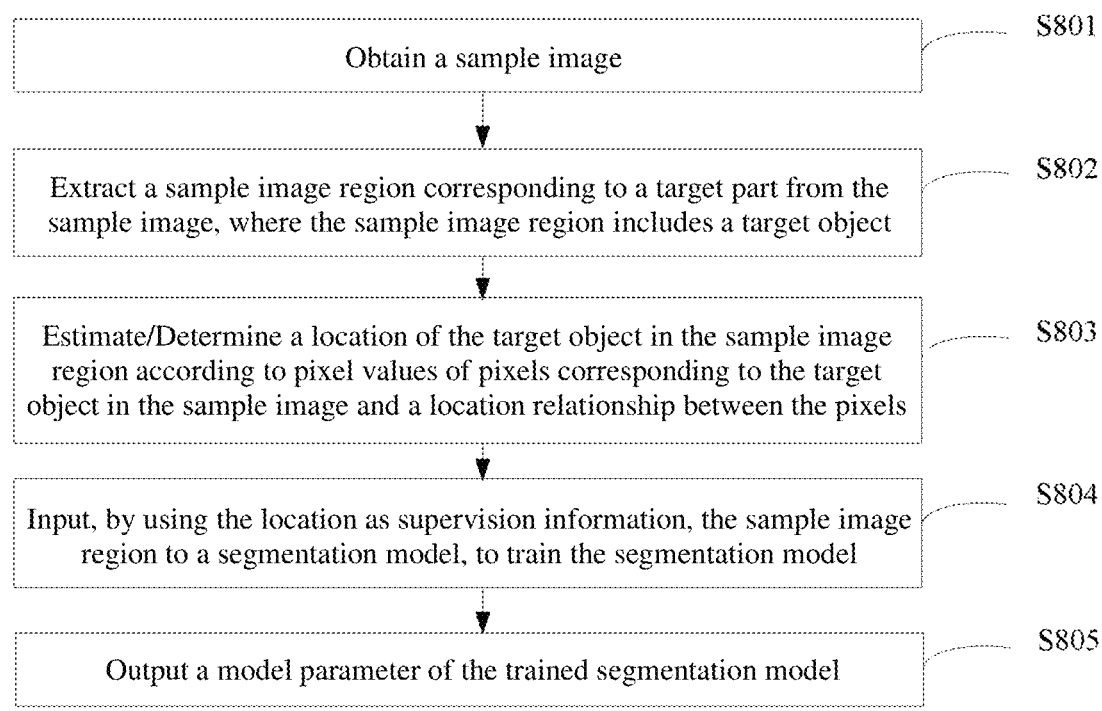
FIG. 11 is a flowchart of a model training method, according to an embodiment of this application.

Based on the recognition methods provided in the foregoing embodiments, FIG. 11 is a flowchart of a model training method, according to an embodiment of this application. The model training method is used for training the second segmentation model mentioned in the embodiments shown in FIG. 1 to FIG. 8, and may be further used for training the first segmentation model and the second segmentation model mentioned in the embodiment shown in FIG. 9.

As shown in FIG. 11, the method may include steps S801-S805.

At S801, a recognition device obtains a sample image.

At S802, the recognition device extracts a sample image region corresponding to a target part from the sample image, where the sample image region includes a target object.

The sample image may be continuously collected in actual application, or may be obtained through partnership with a medical treatment institution such as a hospital. Then, in an example, the sample image region may be extracted from the sample image according to pixel values of pixels in the sample image. In another example, the sample image may be inputted to a segmentation model, that is, the foregoing first segmentation model, for the segmentation model to determine a location of the target part, and the sample image region corresponding to the target part is extracted. For content not described in detail in this step, reference may be made to the related content in the embodiment shown in FIG. 1.

At S803, the recognition device estimates a location of the target object in the sample image region according to pixel values of pixels corresponding to the target object in the sample image and a location relationship between the pixels.

At S804, the recognition device inputs, by using the location as supervision information, the sample image region to a segmentation model, to train the segmentation model.

Then, the location of the target object in the sample image region is determined according to the pixel values of the pixels in the sample image. Pixels in the sample image region whose pixel values fall within a preset range are determined as target pixels, and locations of the plurality of target pixels are the location of the target object. Further, the location of the target object obtained in this case is further manually corrected, and the sample image region is inputted to the segmentation model by using the corrected location as supervision information, to train the segmentation model.

In some embodiments, to ensure concise and clear description, the sample image obtained in step S801 may be referred to as a first sample image. In this case, the user may further manually label both a second sample image obtained in another manner, and a location of the target object in a target sample region of the second sample image, to obtain supervision information of the second sample image. Then, the segmentation model is trained by using the two sample images and respective supervision information.

That is to say, among sample images used for training the segmentation model, some sample images are completely manually labeled, and some other sample images are automatically labeled and then manually corrected. In this way, efficiency of labeling the sample images, that is, efficiency of model training may be improved.

Additionally, accuracy of the supervision information affects an effect of training the model. Therefore, for the target pixels obtained in step S803, before manual correction is performed, the target pixels may be further corrected according to locations of the plurality of target pixels in the sample image region, and finally the location target object in the sample image region is determined according to the corrected target pixels.

Because the target pixels are determined according to the pixel values of the pixels, it is very easy for an isolated target pixel point to occur. The pixels used for describing the target object are usually a plurality of pixels whose pixel coordinates are close. In this case, this isolated target pixel point may be considered as a noisy point in the sample image, and may be directly filtered out.

Moreover, a case that a non-target pixel point B is surrounded by the target pixels may further occur. In this case, this non-target pixel point B may be assumed as a target pixel point, thereby completing pixel point correction.

It should be noted that, the model training method provided in this embodiment may be performed before the recognition method provided in this application is performed, or may be individually performed independently of the recognition method provided in the embodiments of this application.

In this embodiment, after the sample image is obtained, the sample image region corresponding to the target part and related to model training may be extracted from the sample image. Then, the location of the target object is determined according to the pixel values of the pixels in the sample image region, and after the location is manually corrected, this corrected location is supervision information used in the model training process. Compared with the conventional manner of manually labeling the target object in the sample image to obtain supervision information, the foregoing manner can greatly improve efficiency, to further improve efficiency of model training.

In some embodiments, the foregoing model training manner may be deployed on a server, to provide a model training service platform. For a user having a model training requirement, the user may directly input a sample image collected by the user to the service platform, and the service platform may automatically train a segmentation model according to the foregoing manner After step S804, the foregoing model training method may further include the following step:

At S805, the recognition device outputs a model parameter of the segmentation model.

After training, the model parameter of the segmentation model may be outputted. In some embodiments, the model parameter may be outputted each time a preset quantity of rounds of training are performed, or the model parameter of this model may be outputted to the user after the segmentation model converges, thereby meeting the model training requirement of the user. If the user is not satisfied with the model parameter, a re-training operation may be further triggered, to perform model training again.

In some embodiments, after the sample image is obtained in step S801, the user may further perform an operation such as scaling or tapping on the sample image, and a location in which the foregoing operation is triggered is a region in which the user is interested, that is, a location on which emphasis needs to be placed in a training process. Therefore, this region of interest may be further introduced into the model training process as feedback information, that is, an attention mechanism is introduced into the model training process.

Recognition apparatuses of one or more embodiments of this application are described in detail below. A person skilled in the art may understand that all the recognition apparatuses can be formed by configuring market-selling hardware components through steps instructed in this solution.

Figure 12:
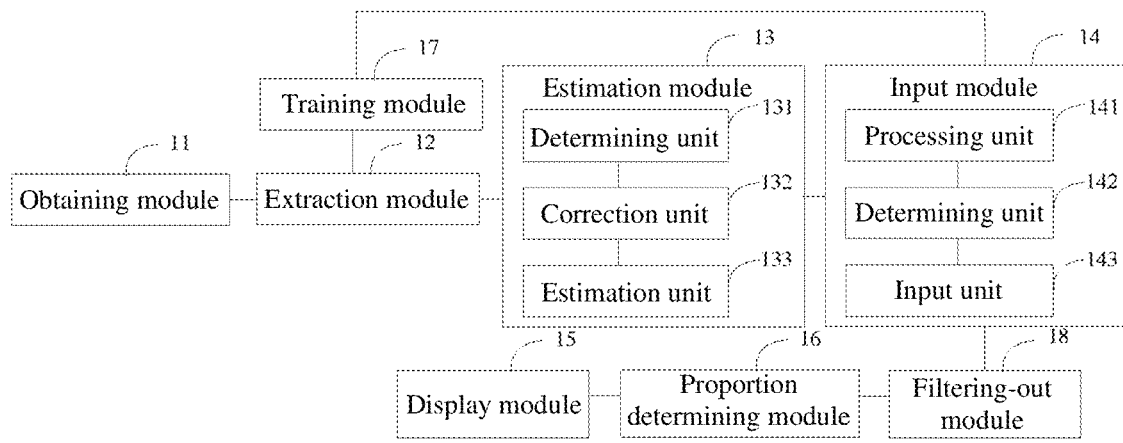
FIG. 12 is a schematic structural diagram of a recognition apparatus, according to an embodiment of this application.

FIG. 12 is a schematic structural diagram of a recognition apparatus, according to an embodiment of this application. As shown in FIG. 12, the apparatus includes:

an obtaining module 11, configured to obtain an image in response to an input operation triggered by a user;

an extraction module 12, configured to extract a target image region corresponding to a target part from the image, where the target image region includes a target object;

an estimation/determination module 13, configured to estimate/determine a location of the target object in the target image region according to pixel values of pixels in the target image region and a location relationship between the pixels under a first condition;

an input module 14, configured to input the target image region to a segmentation model under a second condition, for the segmentation model to output the location of the target object in the target image region; and a display module 15, configured to display a recognition result including the location of the target object in the target image region.

In some embodiments, the apparatus further includes: a proportion determining module 16, configured to determine a size of the target object; and determine a proportion of the target object in the target image region according to the size.

The display module 15 is further configured to display a recognition result including the proportion.

In some embodiments, the first condition is that a quantity of historical images obtained within a preset period of time is less than a preset quantity, and the historical images are labeled with locations of the target object in the historical images.

The second condition is that a quantity of historical images obtained within a preset period of time is greater than or equal to a preset quantity, and the historical images are labeled with locations of the target object in the historical images.

The apparatus further includes a training module 17.

The extraction module 12 is configured to extract historical image regions corresponding to a target part from the historical images, where the historical image regions include a target object; and the training module 17 is configured to input the historical image regions to a segmentation model by using locations of the target object in the historical image regions as supervision information, to train the segmentation model.

In some embodiments, the estimation module 13 includes:

a determining unit 131, configured to determine a plurality of target pixels in the target image region whose pixel values meet a preset range;

a correction unit 132, configured to correct the plurality of target pixels according to a location relationship between the plurality of target pixels; and an estimation unit 133, configured to estimate the location of the target object in the target image region according to locations of corrected target pixels.

The image is a medical image.

In some embodiments, the input module 14 includes:

a processing unit 141, configured to perform dilation processing on the target image region;

a determining unit 142, configured to determine an image region that has a preset size and that includes a dilation result in the image, where the preset size is greater than a size of the target image region; and an input unit 143, configured to input the image region that includes the dilation result to the segmentation model, for the segmentation model to output the location of the target object.

In some embodiments, the apparatus further includes: a filtering-out module 18, configured to filter out the target object according to a size of the target object and/or a location of the target object in the image region that includes the dilation result.

The display module 15 is further configured to display a recognition result including locations of remaining target objects in the target image region.

In some embodiments, the filtering-out module 18 is configured to: filter out the target object if the size of the target object is less than a preset threshold; and/or filter out the target object if the target object is not located in the target image region.

The apparatus shown in FIG. 12 can perform the method according to the embodiments shown in FIG. 1 to FIG. 5. For a part that is not described in this embodiment in detail, reference may be made to the related descriptions of the embodiments shown in FIG. 1 to FIG. 5. For an execution process and technical effects of the technical solution, reference may be made to the descriptions of the embodiments shown in FIG. 1 to FIG. 5, and details are not described herein again.

Figure 13:
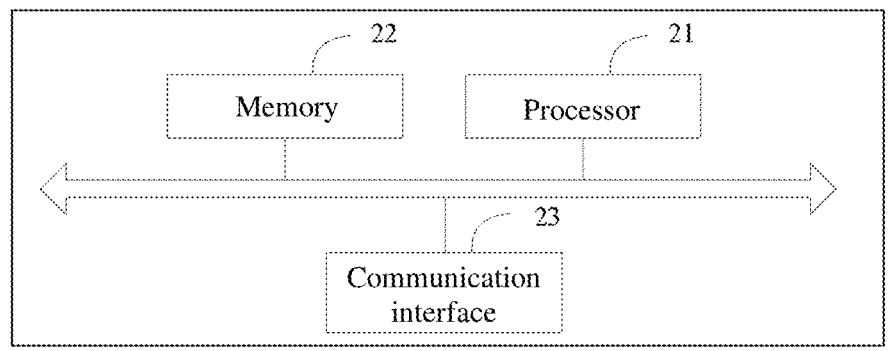
FIG. 13 is a schematic structural diagram of an electronic device corresponding to the recognition apparatus, according to the embodiment shown in FIG. 12.

The internal function and structure of the target detection apparatus is described above. In a possible design, the structure of the target detection apparatus may be embodied as an electronic device. As shown in FIG. 13, the electronic device may include a processor 21 and a memory 22. The memory 22 is configured to store a program for supporting the electronic device in performing the object detection method provided in the embodiments shown in FIG. 1 to FIG. 5, and the processor 21 is configured to execute the program stored in the memory 22.

The program includes one or more computer instructions, where when the one or more computer instructions are executed by the processor 21, the following steps can be implemented:

obtaining an image in response to an input operation triggered by a user;

extracting a target image region corresponding to a target part from the image, where the target image region includes a target object;

estimating a location of the target object in the target image region according to pixel values of pixels in the target image region and a location relationship between the pixels under a first condition;

inputting the target image region to a segmentation model under a second condition, for the segmentation model to output the location of the target object in the target image region; and displaying a recognition result including the location of the target object in the target image region.

In some embodiments, the processor 21 may be further configured to perform all or some of steps of the foregoing embodiments shown in FIG. 1 to FIG. 5.

The structure of the electronic device may further include a communication interface 23, for the electronic device to communicate with another device or communication network.

In addition, an embodiment of this application further provides a computer storage medium, configured to store a computer software instruction used by the foregoing electronic device, and the computer storage medium includes a related program used for performing the object detection method in the method embodiments shown in FIG. 1 to FIG. 5.

Figure 14:
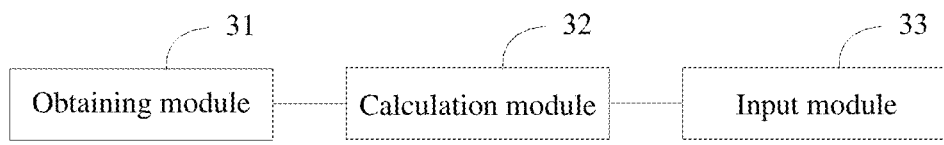
FIG. 14 is a schematic structural diagram of another recognition apparatus, according to an embodiment of this application.

FIG. 14 is a schematic structural diagram of another recognition apparatus, according to an embodiment of this application. As shown in FIG. 14, the apparatus includes:

an obtaining module 31, configured to obtain an image, where the image includes a target image region, and the target image region includes a target object;

a calculation module 32, configured to calculate a location of the target object in the target image region according to pixel values of at least a part of pixels in the target image region and a location relationship between the pixels under a first condition; and an input module 33, configured to input the target image region to a segmentation model under a second condition, for the segmentation model to output the location of the target object in the target image region.

The apparatus shown in FIG. 14 can perform the method according to the embodiment shown in FIG. 6. For a part that is not described in this embodiment in detail, reference may be made to the related descriptions of the embodiment shown in FIG. 6. For an execution process and technical effects of the technical solution, reference may be made to the description of the embodiment shown in FIG. 6, and details are not described herein again.

Figure 15:
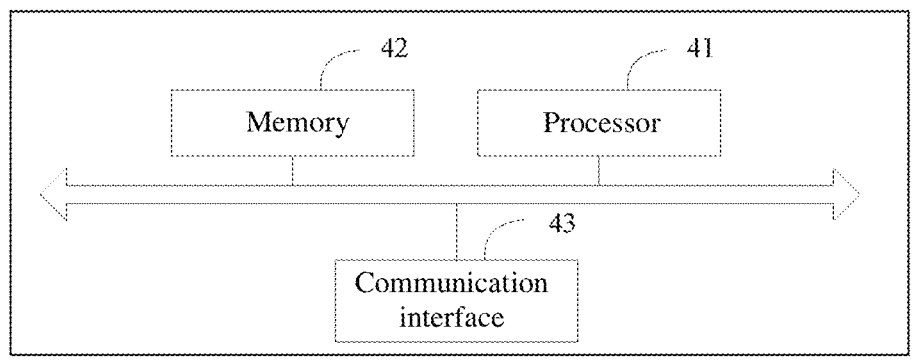
FIG. 15 is a schematic structural diagram of an electronic device corresponding to the recognition apparatus, according to the embodiment shown in FIG. 14.

The internal function and structure of the recognition apparatus is described above. In a possible design, the structure of the recognition apparatus may be embodied as an electronic device. As shown in FIG. 15, the electronic device may include a processor 41 and a memory 42. The memory 42 is configured to store a program for supporting the electronic device in performing the object detection method provided in the embodiment shown in FIG. 6, and the processor 41 is configured to execute the program stored in the memory 42.

The program includes one or more computer instructions, where when the one or more computer instructions are executed by the processor 41, the following steps can be implemented:

obtaining an image, where the image includes a target image region, and the target image region includes a target object;

calculating a location of the target object in the target image region according to pixel values of at least a part of pixels in the target image region and a location relationship between the pixels under a first condition; and inputting the target image region to a segmentation model under a second condition, for the segmentation model to output the location of the target object in the target image region.

In some embodiments, the processor 41 may be further configured to perform all or some of steps of the foregoing embodiment shown in FIG. 6.

The structure of the electronic device may further include a communication interface 43, for the electronic device to communicate with another device or communication network.

In addition, an embodiment of this application further provides a computer storage medium, configured to store a computer software instruction used by the foregoing electronic device, and the computer storage medium includes a related program used for performing the recognition method in the method embodiment shown in FIG. 6.

Figure 16:
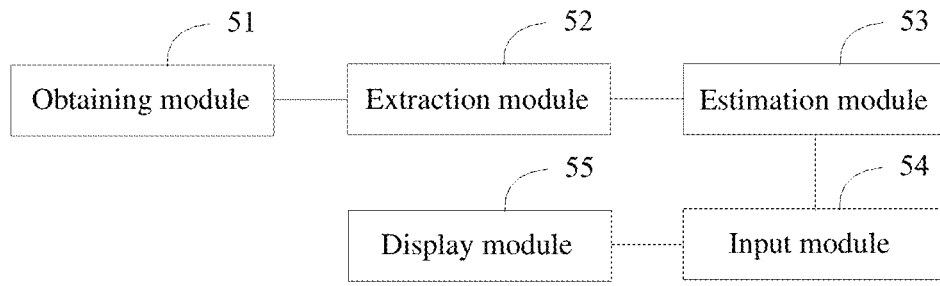
FIG. 16 is a schematic structural diagram of still another recognition apparatus, according to an embodiment of this application.

FIG. 16 is a schematic structural diagram of still another recognition apparatus, according to an embodiment of this application. As shown in FIG. 16, the apparatus includes:

an obtaining module 51, configured to obtain an image in response to an input operation triggered by a user;

an extraction module 52, configured to extract a target image region corresponding to a target part from the image, where the target image region includes a target object;

an estimation/determination module 53, configured to estimate/determine a first location of the target object in the target image region according to pixel values of pixels in the target image region and a location relationship between the pixels;

an input module 54, configured to input the target image region to a segmentation model, for the segmentation model to output a second location of the target object in the target image region; and a display module 55, configured to separately display a recognition result including the first location and a recognition result including the second location.

The apparatus shown in FIG. 16 can perform the method according to the embodiment shown in FIG. 7. For a part that is not described in this embodiment in detail, reference may be made to the related descriptions of the embodiment shown in FIG. 7. For an execution process and technical effects of the technical solution, reference may be made to the description of the embodiment shown in FIG. 7, and details are not described herein again.

Figure 17:
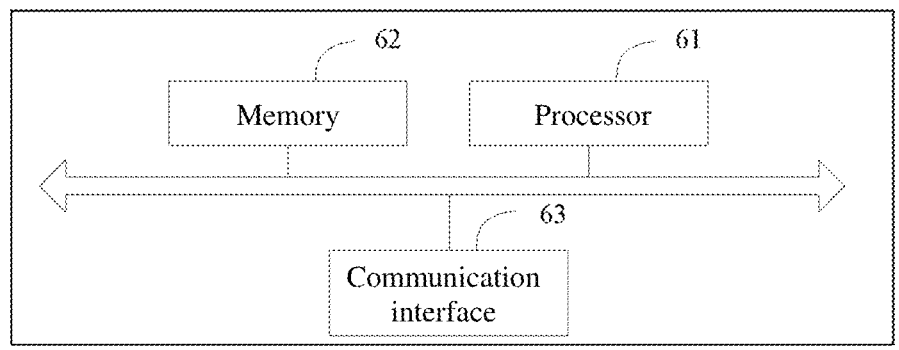
FIG. 17 is a schematic structural diagram of an electronic device corresponding to the recognition apparatus, according to the embodiment shown in FIG. 16.

The internal function and structure of the recognition apparatus is described above. In a possible design, the structure of the recognition apparatus may be embodied as an electronic device. As shown in FIG. 17, the electronic device may include a processor 61 and a memory 62. The memory 62 is configured to store a program for supporting the electronic device in performing the object detection method provided in the embodiment shown in FIG. 7, and the processor 61 is configured to execute the program stored in the memory 62.

The program includes one or more computer instructions, where when the one or more computer instructions are executed by the processor 61, the following steps can be implemented:

obtaining an image in response to an input operation triggered by a user;

extracting a target image region corresponding to a target part from the image, where the target image region includes a target object;

estimating a first location of the target object in the target image region according to pixel values of pixels in the target image region and a location relationship between the pixels;

inputting the target image region to a segmentation model, for the segmentation model to output a second location of the target object in the target image region; and separately displaying a recognition result including the first location and a recognition result including the second location.

In some embodiments, the processor 61 may be further configured to perform all or some of steps of the foregoing embodiment shown in FIG. 7.

The structure of the electronic device may further include a communication interface 63, for the electronic device to communicate with another device or communication network.

In addition, an embodiment of this application further provides a computer storage medium, configured to store a computer software instruction used by the foregoing electronic device, and the computer storage medium includes a related program used for performing the recognition method in the method embodiment shown in FIG. 7.

Figure 18:
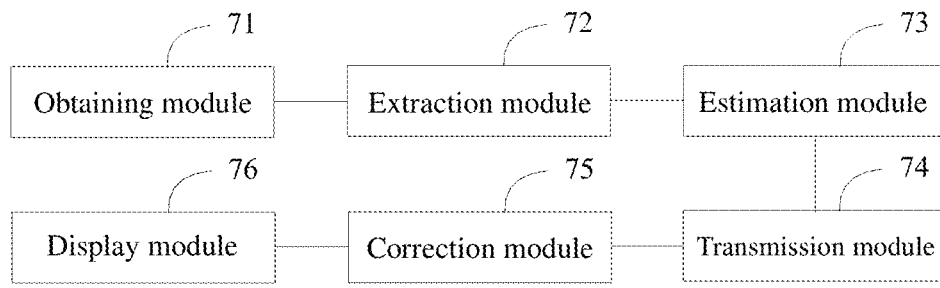
FIG. 18 is a schematic structural diagram of still another recognition apparatus, according to an embodiment of this application.

FIG. 18 is a schematic structural diagram of still another recognition apparatus, according to an embodiment of this application. As shown in FIG. 18, the apparatus includes:

an obtaining module 71, configured to obtain an image in response to an input operation triggered by a user;

an extraction module 72, configured to extract a target image region corresponding to a target part from the image, where the target image region includes a target object;

an estimation/determination module 73, configured to estimate/determine a first location of the target object in the target image region according to pixel values of pixels in the target image region and a location relationship between the pixels;

a transmission module 74, configured to transmit the target image region to a segmentation model, for the segmentation model to output a second location of the target object in the target image region;

a correction module 75, configured to determine a corrected location according to the first location and the second location; and a display module 76, configured to display a recognition result including the corrected location.

The apparatus shown in FIG. 18 can perform the method according to the embodiment shown in FIG. 8. For a part that is not described in this embodiment in detail, reference may be made to the related descriptions of the embodiment shown in FIG. 8. For an execution process and technical effects of the technical solution, reference may be made to the description of the embodiment shown in FIG. 5, and details are not described herein again.

Figure 19:
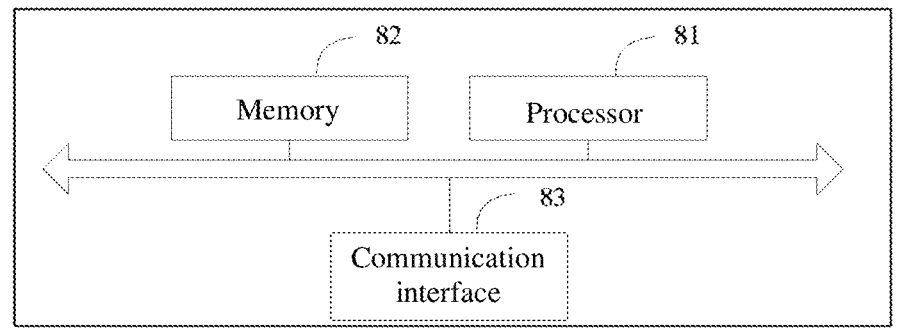
FIG. 19 is a schematic structural diagram of an electronic device corresponding to the recognition apparatus, according to the embodiment shown in FIG. 18.

The internal function and structure of the recognition apparatus is described above. In a possible design, the structure of the recognition apparatus may be embodied as an electronic device. As shown in FIG. 19, the electronic device may include a processor 81 and a memory 82. The memory 82 is configured to store a program for supporting the electronic device in performing the object detection method provided in the embodiment shown in FIG. 8, and the processor 81 is configured to execute the program stored in the memory 82.

The program includes one or more computer instructions, where when the one or more computer instructions are executed by the processor 81, the following steps can be implemented:

obtaining an image in response to an input operation triggered by a user;

extracting a target image region corresponding to a target part from the image, where the target image region includes a target object;

estimating a first location of the target object in the target image region according to pixel values of pixels in the target image region and a location relationship between the pixels;

transmitting the first location and the target image region to a segmentation model, for the segmentation model to output a second location of the target object in the target image region;

correcting the first location according to the second location, to obtain a corrected location; and displaying a recognition result including the corrected location.

In some embodiments, the processor 81 may be further configured to perform all or some of steps of the foregoing embodiment shown in FIG. 8.

The structure of the electronic device may further include a communication interface 83, for the electronic device to communicate with another device or communication network.

In addition, an embodiment of this application further provides a computer storage medium, configured to store a computer software instruction used by the foregoing electronic device, and the computer storage medium includes a related program used for performing the recognition method in the method embodiment shown in FIG. 8.

Figure 20:
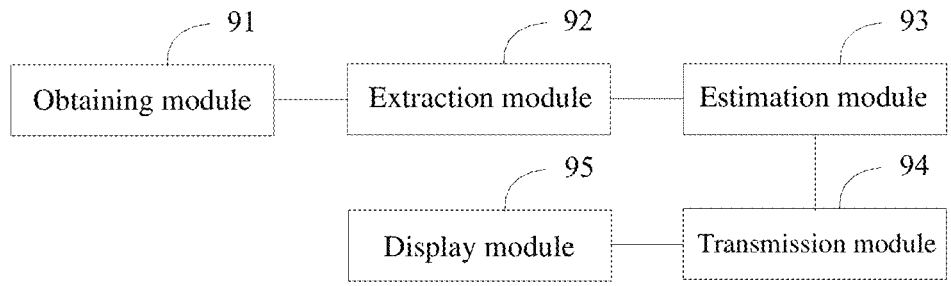
FIG. 20 is a schematic structural diagram of still another recognition apparatus, according to an embodiment of this application.

FIG. 20 is a schematic structural diagram of still another recognition apparatus, according to an embodiment of this application. As shown in FIG. 20, the apparatus includes:

an obtaining module 91, configured to obtain an image in response to an input operation triggered by a user;

an extraction module 92, configured to extract a target image region corresponding to a target part from the image, where the target image region includes a target object;

an input module 93, configured to input the target image region to a first segmentation model, for the segmentation model to output a first location of the target object in the target image region;

a transmission module 94, configured to transmit the target image region to a second segmentation model, for the segmentation model to output a second location of the target object in the target image region, where recognition precision of the first segmentation model is different from recognition precision of the second segmentation model; and a display module 95, configured to separately display a recognition result including the first location and a recognition result including the second location.

The apparatus shown in FIG. 20 can perform the method according to the embodiment shown in FIG. 9. For a part that is not described in this embodiment in detail, reference may be made to the related descriptions of the embodiment shown in FIG. 9. For an execution process and technical effects of the technical solution, reference may be made to the description of the embodiment shown in FIG. 9, and details are not described herein again.

Figure 21:
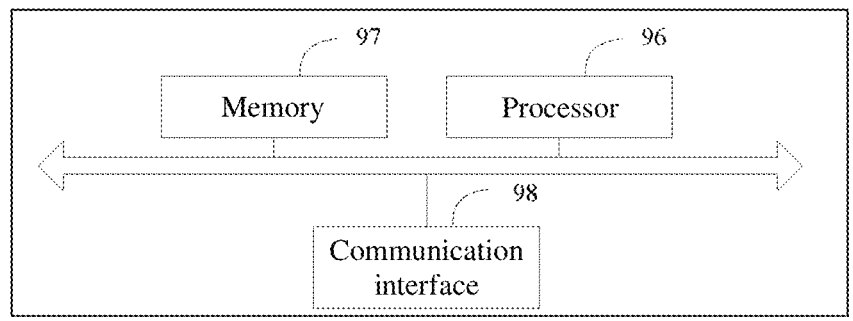
FIG. 21 is a schematic structural diagram of an electronic device corresponding to the recognition apparatus, according to the embodiment shown in FIG. 20.

The internal function and structure of the recognition apparatus is described above. In a possible design, the structure of the recognition apparatus may be embodied as an electronic device. As shown in FIG. 21, the electronic device may include a processor 96 and a memory 97. The memory 97 is configured to store a program for supporting the electronic device in performing the object detection method provided in the embodiment shown in FIG. 9, and the processor 96 is configured to execute the program stored in the memory 97.

The program includes one or more computer instructions, where when the one or more computer instructions are executed by the processor 96, the following steps can be implemented:

obtaining an image in response to an input operation triggered by a user;

extracting a target image region corresponding to a target part from the image, where the target image region includes a target object;

transmitting the target image region to a first segmentation model, for the segmentation model to output a first location of the target object in the target image region;

transmitting the target image region to a second segmentation model, for the segmentation model to output a second location of the target object in the target image region, where recognition precision of the first segmentation model is different from recognition precision of the second segmentation model; and separately displaying a recognition result including the first location and a recognition result including the second location.

In some embodiments, the processor 96 may be further configured to perform all or some of steps of the foregoing embodiment shown in FIG. 9.

The structure of the electronic device may further include a communication interface 98, for the electronic device to communicate with another device or communication network.

In addition, an embodiment of this application further provides a computer storage medium, configured to store a computer software instruction used by the foregoing electronic device, and the computer storage medium includes a related program used for performing the recognition method in the method embodiment shown in FIG. 9.

Figure 22:
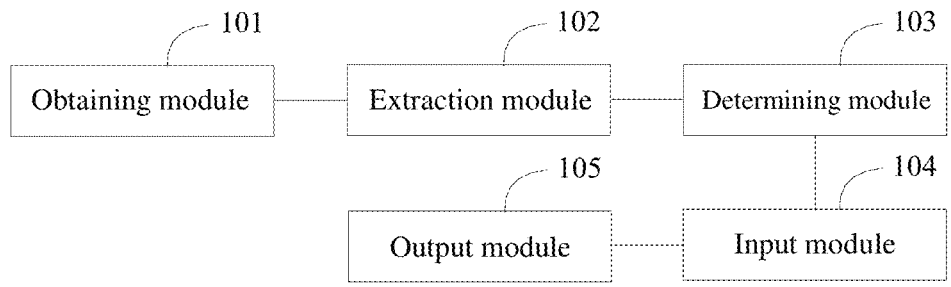
FIG. 22 is a schematic structural diagram of a model training apparatus, according to an embodiment of this application.

FIG. 22 is a schematic structural diagram of a model training apparatus, according to an embodiment of this application. As shown in FIG. 22, the apparatus includes:
an obtaining module 101, configured to obtain a sample image;
an extraction module 102, configured to extract a sample image region corresponding to a target part from the sample image, where the sample image region includes a target object;
a determining module 103, configured to determine a location of the target object in the sample image region according to pixel values of pixels corresponding to the target object in the sample image and a location relationship between the pixels;
an input module 104, configured to input, by using the location as supervision information, the sample image region to a segmentation model, to train the segmentation model; and
an output module 105, configured to output a model parameter of the segmentation model.

The apparatus shown in FIG. 22 can perform the method according to the embodiment shown in FIG. 11. For a part that is not described in this embodiment in detail, reference may be made to the related descriptions of the embodiment shown in FIG. 11. For an execution process and technical effects of the technical solution, reference may be made to the description of the embodiment shown in FIG. 11, and details are not described herein again.

Figure 23:
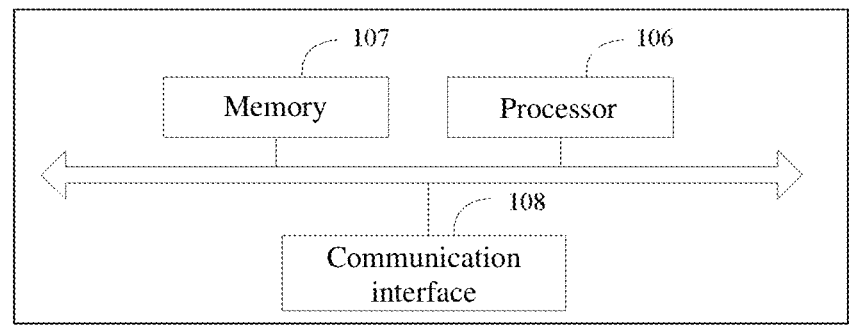
FIG. 23 is a schematic structural diagram of an electronic device corresponding to the model training apparatus, according to the embodiment shown in FIG. 22.

The internal function and structure of the model training apparatus is described above. In a possible design, the structure of the model training apparatus may be embodied as an electronic device. As shown in FIG. 23, the electronic device may include a processor 106 and a memory 107. The memory 107 is configured to store a program for supporting the electronic device in performing the model training method provided in the embodiment shown in FIG. 8, and the processor 106 is configured to execute the program stored in the memory 107.

The program includes one or more computer instructions, where when the one or more computer instructions are executed by the processor 106, the following steps can be implemented:
obtaining a sample image;
extracting a sample image region corresponding to a target part from the sample image, where the sample image region includes a target object;
determining a location of the target object in the sample image region according to pixel values of pixels corresponding to the target object in the sample image and a location relationship between the pixels;
inputting, by using the location as supervision information, the sample image region to a segmentation model, to train the segmentation model; and
outputting a model parameter of the segmentation model.

In some embodiments, the processor 106 may be further configured to perform all or some of steps of the foregoing embodiment shown in FIG. 11.

The structure of the electronic device may further include a communication interface 108, for the electronic device to communicate with another device or communication network.

In addition, an embodiment of this application further provides a computer storage medium, configured to store a computer software instruction used by the foregoing electronic device, and the computer storage medium includes a related program used for performing the model training method in the method embodiment shown in FIG. 11.

Finally, the foregoing embodiments are merely intended for describing the technical solutions of this application but not for limiting this application. Although this application is described in detail with reference to the foregoing embodiments, a person of ordinary skill in the art shall understand that modifications may still be made to the technical solutions described in the foregoing embodiments or equivalent replacements may still be made to some technical features thereof, without departing from the spirit and scope of the technical solutions of the embodiments of this application.

What is claimed is:

1. An image recognition method, comprising:
obtaining an image;
extracting a target image region corresponding to a target part from the image, wherein the target image region comprises a target object;
determining a location of the target object in the target image region by inputting the target image region to a trained segmentation model to obtain the location of the target object in the target image region, wherein the inputting comprises:
performing dilation processing on the target image region to generate a dilated target image region;
determining an image region in the dilated target image region that has a preset size, wherein the preset size is greater than a size of the target image region; and
providing the image region to the trained segmentation model to obtain the location of the target object in the target image region; and
displaying a recognition result of the image, wherein the recognition result indicates the location of the target object in the target image region.

2. The method according to claim 1, further comprising:
determining a size of the target object; and
determining a proportion of the target object in the target image region according to the size of the target object, wherein the recognition result comprises the proportion.

3. The method according to claim 1, wherein the location of the target object in the target image region is obtained by inputting the target image region to the trained segmentation model under a second condition, wherein the second condition indicated that a quantity of historical images obtained within a preset period of time is greater than or equal to the preset quantity; and the method further comprises:
extracting historical image regions corresponding to the target part from the historical images, wherein the historical image regions comprise the target object; and training a segmentation model using the locations of the target object in the historical image regions to obtain the trained segmentation model.

4. The method according to claim 1, wherein the determining a location of the target object in the target image region according to pixel values of pixels in the target image region and a location relationship between the pixels comprises:
   determining a plurality of target pixels in the target image region that have pixel values meeting a preset range;
   correcting the plurality of target pixels according to a location relationship between the plurality of target pixels to generate corrected target pixels; and
   determining the location of the target object in the target image region according to locations of the corrected target pixels.

5. The method according to claim 1, wherein the image region comprises a plurality of target objects, the method further comprising:
   filtering out one or more target objects according to a size of the target objects and/or a location of the target objects in the image region; and
   the displaying a recognition result of the image comprises: displaying a recognition result indicating locations of remaining target objects in the target image region.

6. The method according to claim 5, wherein the filtering out one or more target objects according to a size of the target objects and/or a location of the target objects in the image region comprises:
   filtering out the one or more target objects if the size of the one or more target objects is less than a preset threshold; and/or
   filtering out the one or more target objects if the one or more target objects are not located in the target image region.

7. The method according to claim 1, wherein the trained segmentation model comprises a convolutional neural network.

8. The method according to claim 1, wherein:
   the determining the location of the target object in the target image region obtains a first location of the target object in the target image region;
   the providing the target image region to the trained segmentation model obtains a second location of the target object in the target image region; and
   the displaying the recognition result comprises displaying the first location and the second location separately.

9. An apparatus comprising:
   one or more processors; and
   a memory communicatively connected to the one or more processors, wherein the memory stores instructions executable by the one or more processors to cause the one or more processors to perform operations including:
   obtaining an image;
   extracting a target image region corresponding to a target part from the image, wherein the target image region comprises a target object;
   determining a location of the target object in the target image region (i) according to pixel values of pixels in the target image region and a location relationship between the pixels when a quantity of historical images obtained within a preset period of time is less than a preset quantity, and (ii) by inputting the target image region to a trained segmentation model to obtain the location of the target object in the target image region when the quantity of the historical images obtained within the preset period of time is greater than or equal to the preset quantity; and
   displaying a recognition result of the image, wherein the recognition result indicates the location of the target object in the target image region.

10. The apparatus according to claim 9, wherein the operations further comprise:
    determining a size of the target object; and
    determining a proportion of the target object in the target image region according to the size of the target object, wherein the recognition result comprises the proportion.

11. The apparatus according to claim 9, wherein the historical images are labeled with locations of the target object in the historical images.

12. The apparatus according to claim 9, wherein
    the operations further comprise:
    extracting historical image regions corresponding to the target part from the historical images, wherein the historical image regions comprise the target object; and
    training a segmentation model using the locations of the target object in the historical image regions to obtain the trained segmentation model.

13. The apparatus according to claim 9, wherein the determining a location of the target object in the target image region according to pixel values of pixels in the target image region and a location relationship between the pixels comprises:
    determining a plurality of target pixels in the target image region that have pixel values meeting a preset range;
    correcting the plurality of target pixels according to a location relationship between the plurality of target pixels to generate corrected target pixels; and
    determining the location of the target object in the target image region according to locations of the corrected target pixels.

14. The apparatus according to claim 9, wherein the inputting the target image region to a trained segmentation model to obtain the location of the target object in the target image region comprises:
    performing dilation processing on the target image region to generate a dilated target image region;
    determining an image region in the dilated target image region that has a preset size, wherein the preset size is greater than a size of the target image region; and
    providing the image region to the trained segmentation model to obtain the location of the target object in the target image region.

15. The apparatus according to claim 14, wherein the image region comprises a plurality of target objects, and the operations further comprise:
    filtering out one or more target objects according to a size of the target objects and/or a location of the target objects in the image region; and
    the displaying a recognition result of the image comprises: displaying a recognition result indicating locations of remaining target objects in the target image region.

16. The apparatus according to claim 15, wherein the filtering out one or more target objects according to a size of the target objects and/or a location of the target objects in the image region comprises:
    filtering out the one or more target objects if the size of the one or more target objects is less than a preset threshold; and/or filtering out the one or more target objects if the one or more target objects are not located in the target image region.

17. The apparatus according to claim 9, wherein the trained segmentation model comprises a convolutional neural network.

18. One or more non-transitory computer-readable storage media storing instructions which, when executed by one or more processors, cause the one or more processors to perform operations including:

obtaining an image;

extracting a target image region corresponding to a target part from the image, wherein the target image region comprises a target object;

determining a location of the target object in the target image region (i) according to pixel values of pixels in the target image region and a location relationship between the pixels when a quantity of historical images obtained within a preset period of time is less than a preset quantity, and (ii) by inputting the target image region to a trained segmentation model to obtain the location of the target object in the target image region when the quantity of the historical images obtained within the preset period of time is greater than or equal to the preset quantity; and displaying a recognition result of the image, wherein the recognition result indicates the location of the target object in the target image region.

* * * * *